(12) United States Patent
Watanabe

(10) Patent No.: US 8,200,069 B2
(45) Date of Patent: Jun. 12, 2012

(54) DATA INDICATING METHOD, REPRODUCING DEVICE, RECORDING DEVICE

(75) Inventor: Akinobu Watanabe, Yokohama (JP)

(73) Assignee: Hitachi, Ltd., Tokyo (JP)

(*) Notice: Subject to any disclaimer, the term of this patent is extended or adjusted under 35 U.S.C. 154(b) by 1091 days.

(21) Appl. No.: 11/700,135

(22) Filed: Jan. 31, 2007

(65) Prior Publication Data

US 2007/0286565 A1    Dec. 13, 2007

(30) Foreign Application Priority Data

Jun. 13, 2006 (JP) ................. 2006-162966

(51) Int. Cl.
*H04N 5/89* (2006.01)
*H04N 5/93* (2006.01)
(52) U.S. Cl. ................. 386/336; 386/335; 386/284
(58) Field of Classification Search ............... 386/335, 386/352, 336, 284
See application file for complete search history.

(56) References Cited

U.S. PATENT DOCUMENTS

| | | | | |
|---|---|---|---|---|
| 2005/0108466 A1* | 5/2005 | Takashima et al. | ........... | 711/100 |
| 2005/0196143 A1* | 9/2005 | Kato et al. | ........... | 386/69 |
| 2005/0254363 A1* | 11/2005 | Hamada et al. | ........... | 369/47.1 |
| 2006/0092794 A1* | 5/2006 | Takashima et al. | ........... | 369/53.2 |
| 2007/0194117 A1* | 8/2007 | Takashima et al. | ........... | 235/454 |

FOREIGN PATENT DOCUMENTS

| | | |
|---|---|---|
| CN | 1584935 | 2/2005 |
| JP | 2005-11428 A | 1/2005 |
| JP | 2005-11430 A | 1/2005 |
| JP | 2005-50412 A | 2/2005 |
| JP | 2005-135472 A | 5/2005 |
| JP | 2005-149598 A | 6/2005 |
| JP | 2005-251340 A | 9/2005 |
| JP | 2006-127701 A | 5/2006 |
| WO | WO 2004/075547 A1 | 9/2004 |

OTHER PUBLICATIONS

"White paper Blu-ray Disc Format 2.B Audio Visual Application Format Specifications for BD-ROM", Blu-ray Disc. Mar. 2005, pp. 1-35.
"White paper Blue-ray Disc Format 2.A Logical and Audio Visual Application Format Specifications for BD-RE", Blu-ray Disc. Aug. 2004, pp. 1-26.
Chinese Office Action, with English Translation, issued in Chinese Patent Application No. CN 2007100936191, dated May 8, 2009.

* cited by examiner

*Primary Examiner* — Helen Shibru
(74) *Attorney, Agent, or Firm* — McDermott Will & Emery LLP

(57) ABSTRACT

A BD media with different formats such as BDMV and BDAV having been recorded. In a data indicating method of list-indicating data recorded on a recording medium, the data includes a first data group and a second data group, the first data group is recorded onto the recording medium according to a first recording format, the second data group is recorded according to a second recording format different from the first recording format, the first recording data group includes first list indication data for a first list indicating method, the second group includes second list for a second list indicating method different from the first method, the first list indication data indicates the first data group, the second list indication data indicates the second data group, and the first group and the second data group are collectively list-indicated.

4 Claims, 14 Drawing Sheets

DATA INDICATING METHOD, REPRODUCING DEVICE, RECORDING DEVICE

INCORPORATION BY REFERENCE

The present application claims priority from Japanese application JP2006-162966 filed on Jun. 13, 2006, the content of which is hereby incorporated by reference into this application.

BACKGROUND OF THE INVENTION

1. Field of the Invention

The invention relates to recording and reproducing device and method for recording, indicating, or reproducing data onto/from a recording medium.

2. Description of the Related Art

At present, a DVD (Digital Versatile Disc) is being spread as a recording medium. As a next-generation optical disc of a further large capacity, the standard of a BD (Blu-ray Disc) or an HD (High-Definition)-DVD in which the recording and reproduction are executed by a laser whose wavelength is shorter (405 nm) than that of the DVD have been examined in detail and products at the initial stage have been started to be sold.

Particularly, an attention is paid to the BD because its capacity is larger (25 GB per layer) than that of the HD-DVD and it is suitable to record an image of the HD (High Definition: the number of pixels in the horizontal direction×the vertical direction is equal to, for example, 1920×1080 or 1366×768) whose data amount is larger than that of an image of the conventional SD (Standard Definition: the number of pixels in the horizontal direction×the vertical direction is equal to 720×480 (in the case of NTSC) or 780×576 (in the case of PAL)). As techniques for such a BD, for example, there are WO2004/075547 and JP-A-2006-127701.

In the Blu-ray Disc, a format called a BDMV format has been specified as an application format for read only media. According to such a format, since a substantial interactive menu or the like can be realized and it can cope with a picture-in-picture (PinP) function and a high compression stream such as an H.264 standard, and the like, it has specifications with higher functions than those of the conventional DVD-Video.

A format called a BDAV format has been specified as an application format for rewritable media. According to such a format, since a stream format according to the digital broadcasting standard is used and an editing function is upgraded, its specifications are suitable to record broadcasted programs. (For example, refer to "White paper Blu-ray Disc Format 2.B Audio Visual Application Format Specifications for BD-ROM March 2005" and "White paper Blu-ray Disc Format 2.A Logical and Audio Visual Application Format Specifications for BD-RE August 2004")

SUMMARY OF THE INVENTION

In association with the development of the high-efficient coding technique, a code amount of AV (Audio/Visual) data such as video image, audio sound, and the like is compressed and the AV data can be recorded as digital data onto the recording medium such as hard disk, optical disc, or the like. Thus, AV apparatuses such as player and recorder using the recording medium such as hard disk, optical disc, or the like are being widespread. In the optical discs represented by the DVD and the like used in those player and recorder, the AV data is compressed by the high-efficient coding technique and recorded on the disc in a form according to a predetermined format together with its management information. A file system and an application format to handle those data have also been specified. Further, in an optical disc of the next generation having functions higher than those of the current optical disc, in order to make it possible to handle video data of up to the video data such as an HD image or the like whose resolution is higher than that of the DVD in which only video data of up to an SD image can be handled, the file system and application format different from those in the conventional data format are necessary.

As for the format of the BD, the application format for the read only media for a movie or the like and the application format for the rewritable media for broadcasting recording or the like have been specified and are called a "BDMV (BD MoVie) format" and a "BDAV (BD Audio/Visual) format", respectively.

In the BDMV format, the substantial interactive menu or the like can be realized and it copes with the picture-in-picture (PinP) function and the high compression stream such as an H.264/AVC (Advanced Video Coding) standard specified by Video Coding Experts Group of ITU-T or the like. It has the specifications with the higher functions than those of the conventional DVD-Video. According to the BDAV format, the stream format according to the digital broadcasting standard is used and since the editing function is upgraded, its specifications are suitable to record the broadcasted programs.

Those formats have been defined on the assumption that they are independently used.

However, by coping with both of those formats, advantages of those formats can be provided to the user.

As advantages of those formats, for example, the image compressing technique MPEG2 used in the BDAV is a format which is also generally used in digital broadcasting, has been spread, and can be used in various apparatuses. Since the data is recorded as it is, although picture quality is high, a data amount is large. According to the image compressing technique H.264 used in the BDMV, a compression efficiency is high and a load to a recording time and a capacity can be reduced. However, a penetration rate is low and the apparatuses which can reproduce the data are limited. It is, therefore, considered that it is necessary to selectively use those formats in accordance with an application. In a recording and reproducing device corresponding to both of the BDAV and the BDMV, it is useful that not only the AV data can be divisionally recorded and reproduced but also the AV data can be adaptively mutually converted in accordance with needs.

There are also the following problems: how the AV data is recorded in the coexistence state of the different formats such as BDMV and BDAV; which format should be preferentially used in the case of reproducing the recorded BD media; whether or not both formats are collectively handled; and the like.

Therefore, for example, a technique regarding the recording and reproducing device which can further utilize the advantages of the BDAV and the BDMV is provided.

Specifically speaking, for example, there is provided a data indicating method of list-indicating data recorded on a recording medium, wherein the data includes at least a first data group and a second data group, the first data group is recorded onto the recording medium in accordance with a first recording format, the second data group is recorded onto the recording medium in accordance with a second recording format different from the first recording format, the first recording data group includes first list indication data for a first list indicating method, the second recording data group includes second list indication data for a second list indicating method different from the first list indicating method, the first list indication data indicates the first data group, the second list indication data indicates the second data group, and the first data group and the second data group are collectively list-indicated.

For example, in the data indicating method, the first data group and the second data group are collectively list-indicated by the first list indicating method.

For example, in the data indicating method, the first data group and the second data group are collectively list-indicated by a list indicating method which is different from the first list indicating method and is different from the second list indicating method.

For example, in the data indicating method, a coexistence flag which permits the first data group and the second data group to be collectively list-indicated is provided.

For example, in the data indicating method, the data group of a BDMV format and the data group of a BDAV format are collectively list-indicated.

For example, in the data indicating method, the data group of the BDMV format and the data group of the BDAV format are collectively list-indicated by a list indicating method of the BDMV format.

For example, in the data indicating method, the data group of the BDAV format and the data group of the BDMV format are collectively list-indicated by a list indicating method of the BDAV format.

For example, in the data indicating method, the coexistence flag is a file itself.

For example, in the data indicating method, the coexistence flag is a flag recorded in the file.

For example, in the data indicating method, the first data group and the second data group are collectively list-indicated.

For example, in a reproducing device according to the invention, the first data group and the second data group are collectively list-indicated by the first list indicating method.

For example, in the reproducing device, or playback device, the first data group and the second data group are collectively list-indicated by the list indicating method which is different from the first list indicating method and is different from the second list indicating method.

For example, in the reproducing device, if there is the coexistence flag which permits the first data group and the second data group to be collectively list-indicated, they are collectively list-indicated.

For example, in the reproducing device, the data group of the BDMV format and the data group of the BDAV format are collectively list-indicated.

For example, in the reproducing device, the data group of the BDMV format and the data group of the BDAV format are collectively list-indicated by the list indicating method of the BDMV format.

For example, in the reproducing device, the data group of the BDAV format and the data group of the BDMV format are collectively list-indicated by the list indicating method of the BDAV format.

For example, in the reproducing device, the coexistence flag is the file itself.

For example, in the reproducing device, the coexistence flag is the flag recorded in the file.

For example, in a recording device according to the invention, the second data group is recorded onto the recording medium on which the first data group has been recorded.

For example, in the recording device, the data is additionally recorded to the first data group in accordance with the first recording format on the recording medium on which the first data group and the second data group have been recorded.

For example, in the recording device, either a mode for additionally recording the data to the first data group in accordance with the first recording format on the recording medium on which the first data group and the second data group have been recorded or a mode for additionally recording the data to the second data group in accordance with the second recording format on the recording medium is selected and the data is recorded.

For example, in the recording device, the data group of the BDAV format is recorded onto the recording medium on which the data group of the BDMV format has been recorded.

For example, in the recording device, the data group of the BDMV format is recorded onto the recording medium on which the data group of the BDAV format has been recorded.

For example, in the recording device, the data is additionally recorded to the data group of the BDMV format in accordance with a recording format of the BDMV format on the recording medium on which the data group of the BDMV format and the data group of the BDAV format have been recorded.

For example, in the recording device, the data is additionally recorded to the data group of the BDAV format in accordance with a recording format of the BDAV format on the recording medium on which the data group of the BDAV format and the data group of the BDMV format have been recorded.

For example, in the recording device, either a mode for additionally recording the data to the data group of the BDAV format in accordance with the recording format of the BDAV format on the recording medium on which the data group of the BDAV format and the data group of the BDMV format have been recorded or a mode for additionally recording the data to the data group of the BDMV format in accordance with the recording format of the BDMV format is selected and the data is recorded.

For example, in the recording device, when the second data group is recorded onto the recording medium on which the first data group has been recorded, the coexistence flag which permits the first data group and the second data group to be collectively list-indicated is recorded.

For example, in the recording device, when the data group of the BDAV format is recorded onto the recording medium on which the data group of the BDMV format has been recorded, the coexistence flag which permits the data group of the BDMV format and the data group of the BDAV format to be collectively list-indicated is recorded.

For example, in the recording device, when the data group of the BDMV format is recorded onto the recording medium on which the data group of the BDAV format has been recorded, the coexistence flag which permits the data group of the BDMV format and the data group of the BDAV format to be collectively list-indicated is recorded.

According to the above means, for example, the user can obtain the advantage of each of the different recording formats.

Problems, means, and effects other than those shown as examples in the above will be clarified by embodiments, which will be explained hereinafter.

DESCRIPTION OF THE EMBODIMENTS

Preferred embodiments of the invention will be described hereinbelow with reference to the drawings. However, the invention is not limited to the embodiments.

(1) Explanation of File Construction and Recording Process

First, a conventional data recording system will be explained.

Figure 1:
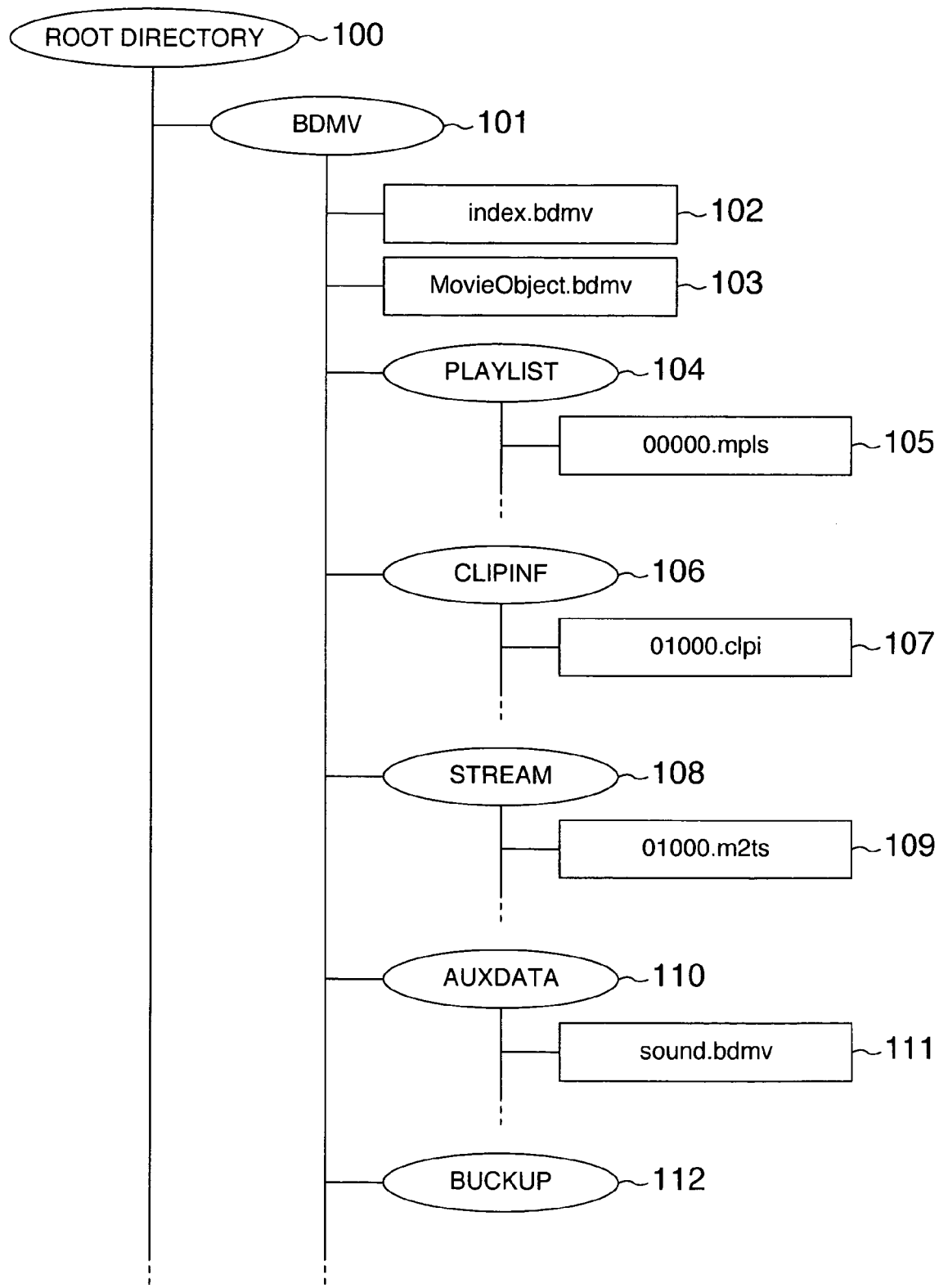
FIG. 1 is a diagram schematically showing an example of a file construction of a BDMV format recorded on a Blu-ray Disc (BD)

FIG. 1 is a diagram schematically showing a file construction of a BDMV format recorded on a Blu-ray Disc (hereinbelow, abbreviated to "BD"). In the diagram, reference numerals 100 to 112 denote the following items.

100 . . . root directory
101 . . . subdirectory BDMV
102 . . . index. bdmv
103 . . . MovieObject. bdmv
104 . . . subdirectory PLAYLIST
105 . . . 00000. mpls
106 . . . subdirectory CLIPINF
107 . . . 01000. clpi
108 . . . subdirectory STREAM
109 . . . 01000. m2ts
110 . . . subdirectory AUXDATA
111 . . . sound. bdmv
112 . . . subdirectory BACKUP The root directory 100 is a most significant directory of the BD and includes the subdirectory BDMV 101.

The subdirectory BDMV 101 is a subdirectory existing just under the root directory 100 and includes the subdirectory PLAYLIST 104, subdirectory CLIPINF 106, subdirectory STREAM 108, subdirectory AUXDATA 110, and subdirectory BACKUP 112.

The index. bdmv 102 is a file existing just under the subdirectory BDMV 101 and is a file describing contents included in the subdirectory BDMV 101.

The MovieObject. bdmv 103 is a file including information regarding the whole movie object.

The subdirectory PLAYLIST 104 is a subdirectory existing just under the subdirectory BDMV 101 and is a directory including a play list file. The 00000. mpls 105 is a file existing just under the subdirectory PLAYLIST 104 and is a file including a play list.

The subdirectory CLIPINF 106 is a subdirectory existing just under the subdirectory BDMV 101 and is a directory including a clip information file.

The 01000. clpi 107 is a file existing just under the subdirectory CLIPINF 106 and is a file in which a time stamp of an access point of the AV stream file 01000. m2ts 109 has been held.

The subdirectory STREAM 108 is a subdirectory existing just under the subdirectory BDMV 101 and is a directory including the AV stream file. The 01000. m2ts 109 is a file existing just under the subdirectory STREAM 108 and includes an MPEG2 transport stream (ISO/IEC 13818-1).

The subdirectory AUXDATA 110 is a subdirectory existing just under the subdirectory BDMV 101 and is a directory including sound data and font data.

The sound. bdmv 111 is a file existing just under the subdirectory AUXDATA 110 and is a file including sound data.

The subdirectory BACKUP 112 is a subdirectory existing just under the subdirectory BDMV 101 and is a directory including a copy of the index. bdmv 102, a copy of the MovieObject. bdmv 103, copies of all files just under the subdirectory PLAYLIST 104, and copies of all files just under the subdirectory CLIPINF 106.

The movie object denotes a bundle of data such as stream file, clip information file, metadata file, and the like which are used when several data regarding one certain movie are collectively handled.

The clip denotes a bundle of data which is used when a stream file and a clip information file regarding one certain movie are collectively handled.

Figure 2:
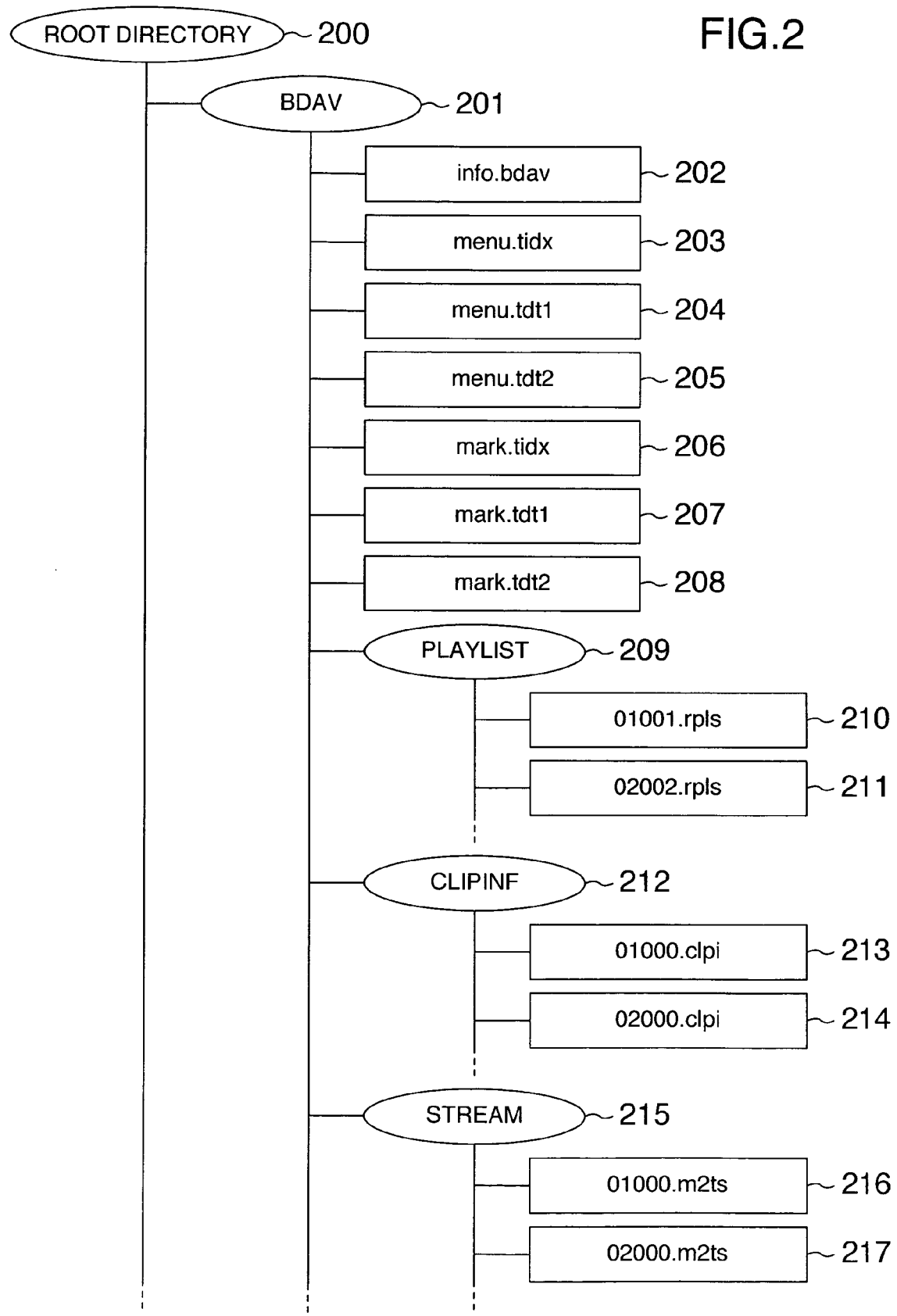
FIG. 2 is a diagram schematically showing an example of a file construction of a BDAV format recorded on the BD.

FIG. 2 is a diagram schematically showing a file construction of the BDAV format recorded on the BD. In the diagram, reference numerals 200 to 217 denote the following items.

200 . . . root directory
201 . . . subdirectory BDAV
202 . . . info. bdav
203 . . . menu. tidx
204 . . . menu. tdt1
205 . . . menu. tdt2
206 . . . mark. tidx
207 . . . mark. tdt1
208 . . . mark. tdt2
209 . . . subdirectory PLAYLIST
210 . . . 01001. rpls
211 . . . 02002. rpls
212 . . . subdirectory CLIPINF
213 . . . 01000. clpi
214 . . . 02000. clpi
215 . . . subdirectory STREAM
216 . . . 01000. m2ts
217 . . . 02000. m2ts The root directory 200 is a most significant directory of the BD and includes the subdirectory BDAV 201.

The subdirectory BDAV 201 is a subdirectory existing just under the root directory 200 and includes the subdirectory PLAYLIST 209, subdirectory CLIPINF 212, and subdirectory STREAM 215.

The info. bdav 202 is a file existing just under the subdirectory BDAV 201 and is a file describing contents included in the subdirectory BDAV 201.

The menu. tidx 203 is a file existing just under the subdirectory BDAV 201 and is a file in which a representative picture of the subdirectory BDAV 201 has been held as a thumbnail.

The menu. tdt1 204 and the menu. tdt2 205 are files existing just under the subdirectory BDAV 201 and are files in which representative pictures of respective play lists included in the subdirectory BDAV 201 have been held as thumbnails.

The mark. tidx 206 is a file existing just under the subdirectory BDAV 201 and includes an index of thumbnail images at marked positions.

The mark. tdt1 207 and the mark. tdt2 208 are files existing just under the subdirectory BDAV 201 and include the thumbnail images at the marked positions.

The subdirectory PLAYLIST 209 is a subdirectory existing just under the subdirectory BDAV 201 and is a directory including a play list.

The 01001. rpls 210 and the 02002. rpls 211 are files existing just under the subdirectory PLAYLIST 209 and are files including the play lists.

The subdirectory CLIPINF 212 is a subdirectory existing just under the subdirectory BDAV 201 and is a directory including a clip information file.

The 01000. clpi 213 is a file existing just under the subdirectory CLIPINF 212 and is a file in which a time stamp of an access point of the AV stream file 01000. m2ts 216 has been held.

The 02000. clpi 214 is a file existing just under the subdirectory CLIPINF 212 and is a file in which a time stamp of an access point of the AV stream file 02000. m2ts 217 has been held.

The subdirectory STREAM 215 is a subdirectory existing just under the subdirectory BDAV 201 and is a directory including the AV stream file.

The 01000. m2ts 216 and the 02000. m2ts 217 are files existing just under the subdirectory STREAM 215 and include an MPEG2 transport stream (ISO/IEC 13818-1).

A data recording system according to the embodiment will now be described.

Figure 3:
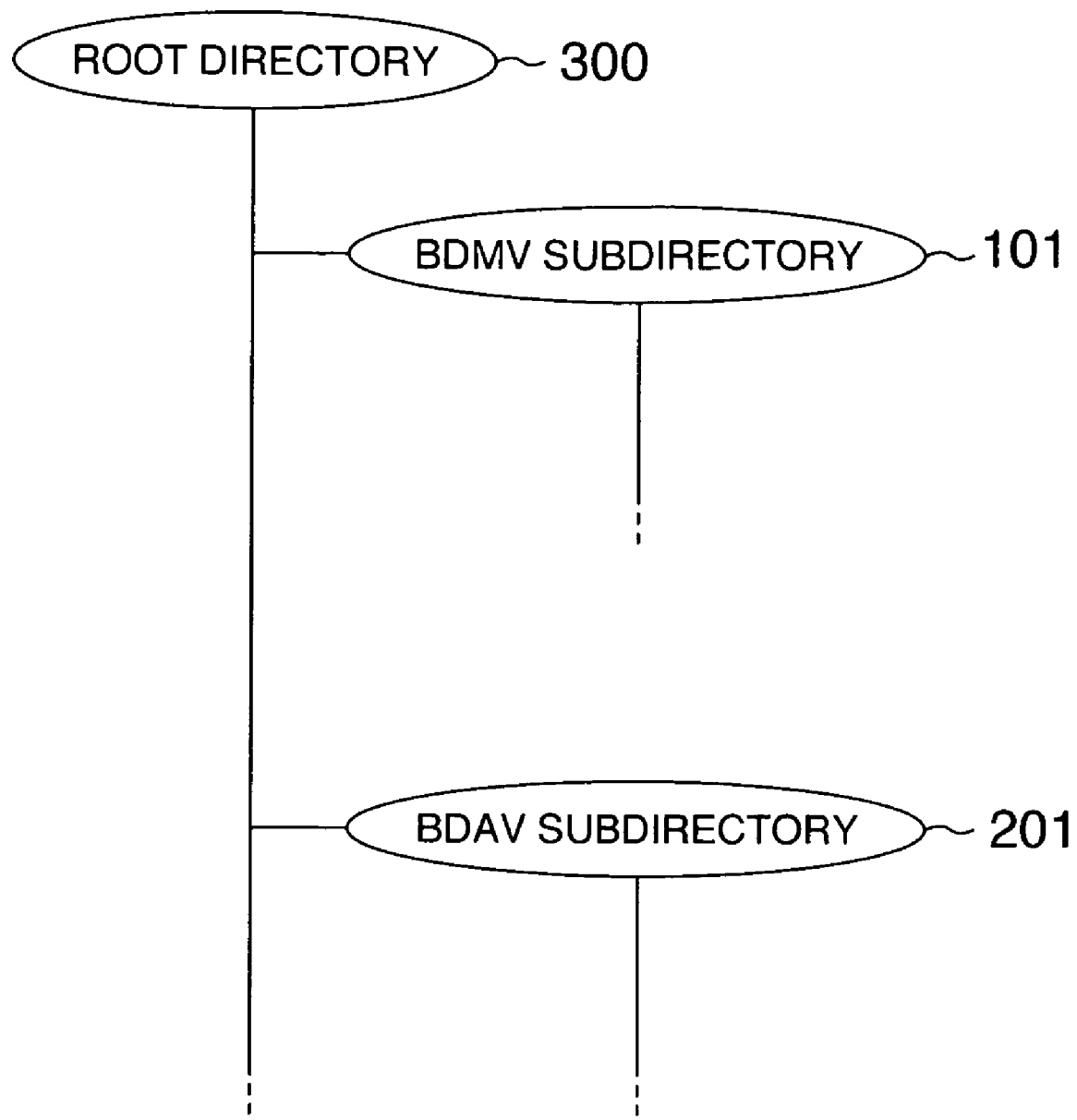
FIG. 3 is a diagram schematically showing an example of a construction of a file recorded on the BD.

FIG. 3 is a diagram schematically showing a construction of a file recorded on the BD in the embodiment.

In the diagram, reference numeral 300 denotes a root directory. Since reference numeral 101 denotes the same as the subdirectory BDMV 101 in FIG. 1, its explanation is omitted here. Likewise, Since reference numeral 201 denotes the same as the subdirectory BDAV 201 in FIG. 2, its explanation is omitted here.

The root directory 300 is a most significant directory of the BD and includes the subdirectory BDMV 101 and the subdirectory BDAV 201.

A recording procedure in the embodiment will now be described.

First, the operation in the case of recording for the first time onto a blank BD where no data is recorded will be described.

Figure 16:
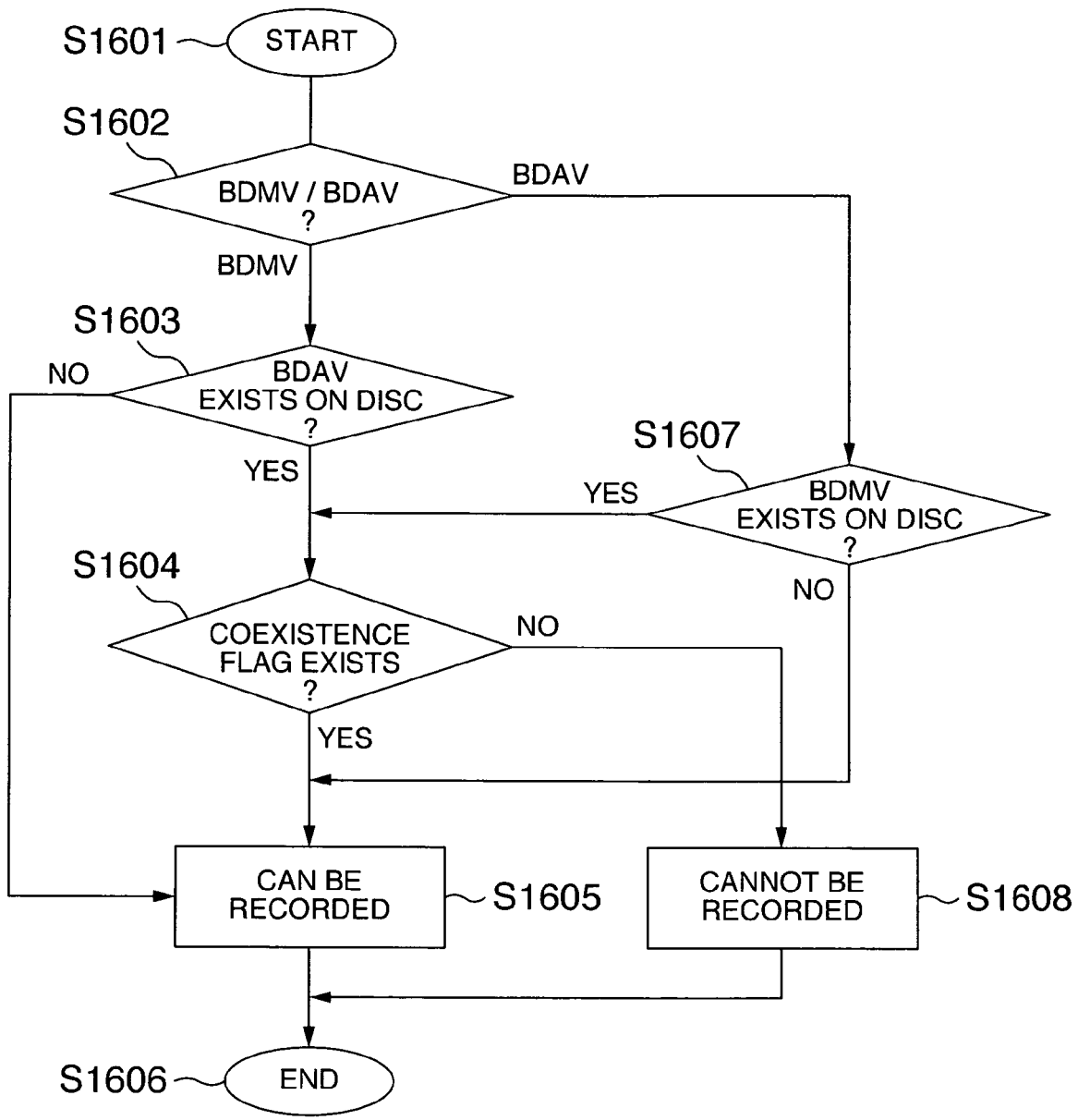
FIG. 16 is a flowchart showing an example of a processing flow in the case of recording data for the first time onto a blank BD where no data is recorded.

FIG. 16 is a flowchart of a processing flow in the case of recording data for the first time onto the blank BD where no data is recorded and is a flowchart for a process to discriminate whether or not the recording is permitted. In the flowchart, S1601 to S1608 denote the following processing steps.

Figure 17:
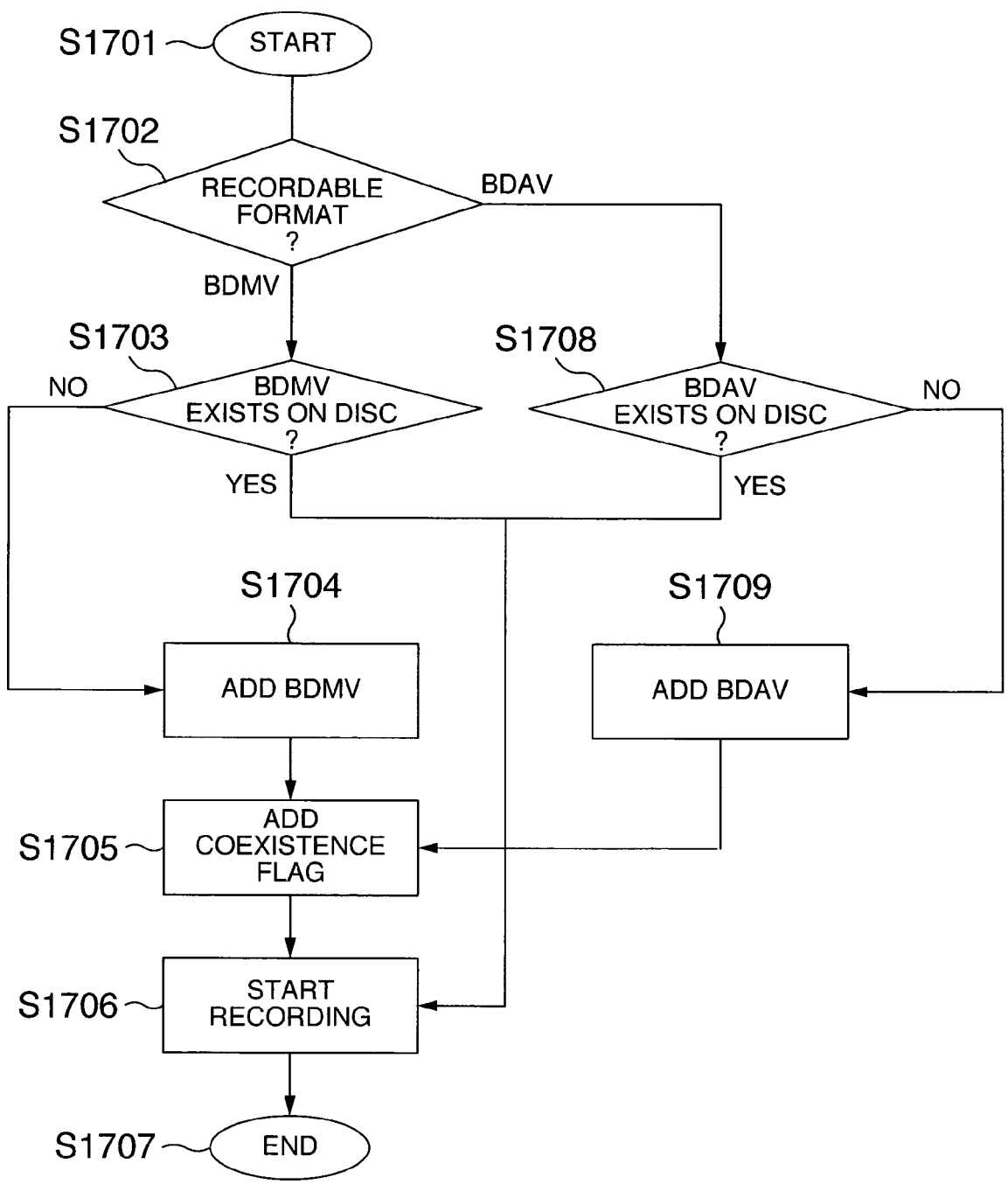
FIG. 17 is a flowchart showing an example of a processing flow in the case of recording data for the first time onto the blank BD where no data is recorded.

S1601 . . . starting step
S1602 . . . step of discriminating a recording mode of a BD recorder
S1603 . . . step of discriminating whether or not the BDAV directory exists in the BD
S1604 . . . step of discriminating the presence or absence of a flag showing that the BDAV and the BDMV coexist in the BD
S1605 . . . process which is executed when a discrimination result indicates that the recording can be performed
S1606 . . . finishing step
S1607 . . . step of discriminating whether or not the BDMV directory exists in the BD
S1608 . . . process which is executed when a discrimination result indicates that the recording cannot be performed FIG. 17 is a flowchart of a processing flow in the case of recording data for the first time onto the blank BD where no data is recorded according to the embodiment and is a flowchart for a recording starting process which is executed after the discrimination about the permission or inhibition of the recording in FIG. 16 was made. In the flowchart, S1701 to S1709 denote the following processing steps.

Figure 18:
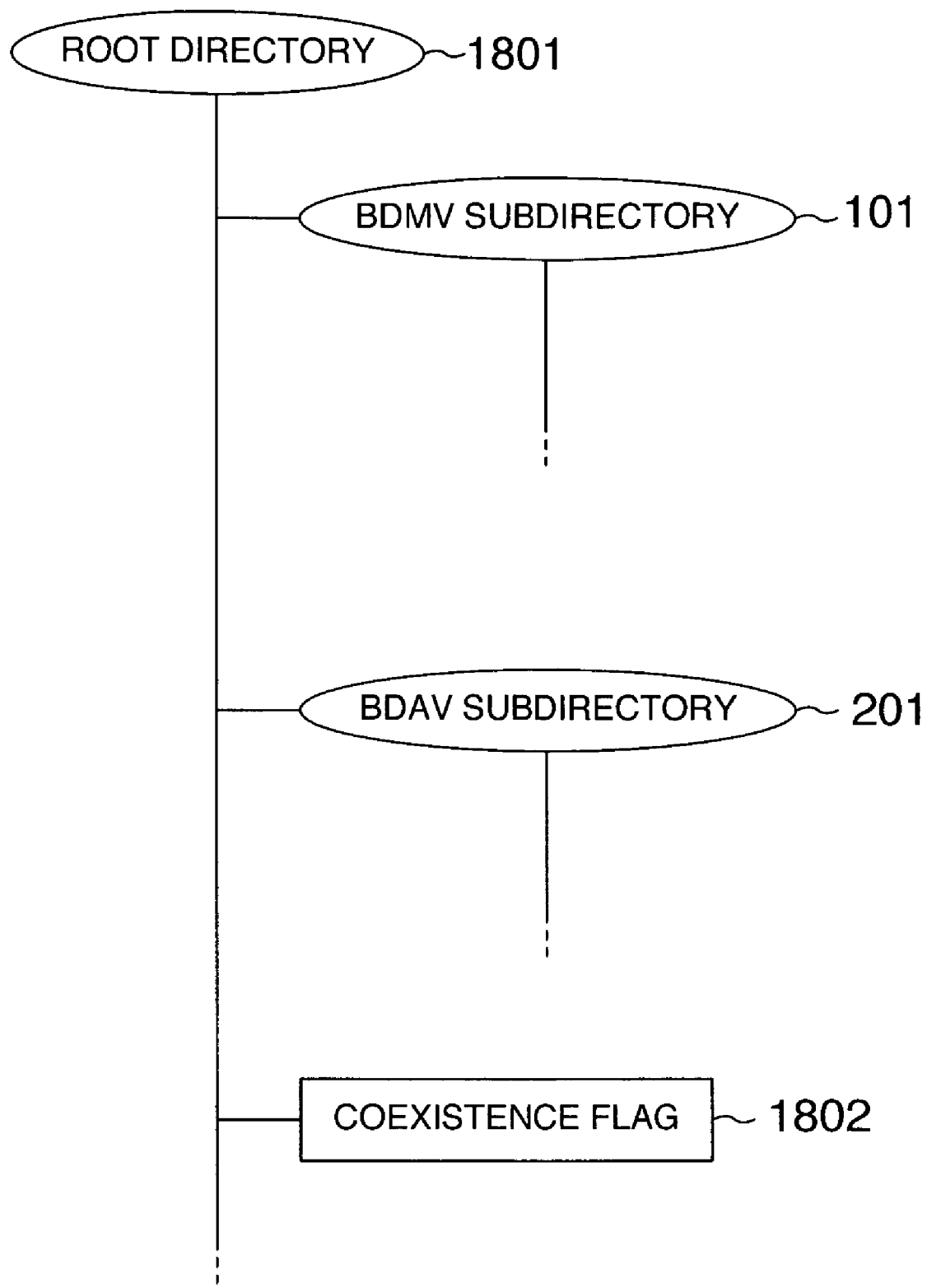
FIG. 18 is a diagram schematically showing an example of a file construction in which the BDMV and the BDAV recorded on the BD coexist.

S1701 . . . starting step
S1702 . . . step of discriminating whether or not a recording format is the BDMV format or the BDAV format
S1703 . . . step of discriminating whether or not the BDMV directory exists in the BD
S1704 . . . step of adding the BDMV directory to the BD
S1705 . . . step of adding the flag showing that the BDAV and the BDMV coexist in the BD
S1706 . . . recording starting step
S1707 . . . finishing step
S1708 . . . step of discriminating whether or not the BDAV directory exists in the BD
S1709 . . . step of adding the BDAV directory to the BD FIG. 18 is a diagram schematically showing a file construction in which the BDMV and the BDAV recorded on the BD coexist according to the embodiment. In the diagram, 1801 . . . root directory
101 . . . subdirectory BDMV
201 . . . subdirectory BDAV
1802 . . . coexistence flag The root directory 1801 is a most significant directory of the BD and includes the subdirectory BDMV 101, subdirectory BDAV 201, and coexistence flag 1802.

The coexistence flag 1802 is a file showing that the subdirectory BDMV 101 and the subdirectory BDAV 201 coexist just under the root directory 1801.

In the embodiment, the following six patterns are considered as patterns which are recorded in the BD.

That is, the six patterns correspond to the following cases:

a case of recording data by the BDMV format for the first time onto the blank BD where no data is recorded;

a case of recording data by the BDAV format for the first time onto the blank BD where no data is recorded;

a case of recording data by the BDMV format onto the BD where the BDMV format has been recorded;

a case of recording data by the BDAV format onto the BD where the BDMV format has been recorded;

a case of additionally recording data by the BDMV format onto the BD where the BDMV format and the BDAV format have been recorded; and a case of additionally recording data by the BDAV format onto the BD where the BDMV format and the BDAV format have been recorded.

In the case of recording data onto the BD by the above six patterns, the following processing flow is executed.

When the BD is inserted into the BD recorder, this processing routine is started. (S1601)

First, the recording mode of the BD recorder is discriminated. (S1602)

If the BD recorder has been set to a BDMV priority mode in S1602, whether or not the data of the BDAV format has already been recorded on the inserted BD is discriminated. (S1603)

If it is determined in S1603 that the BDAV has already been recorded, whether or not the coexistence flag showing whether or not the BDAV and the BDMV can coexist has been recorded on the BD is discriminated. (S1604)

If it is determined in S1604 that the coexistence flag exists, the recording can be executed. (S1605)

If it is determined in S1604 that the coexistence flag does not exist, since the inserted BD is a disc only for use of the BDAV recording, the recording cannot be executed. A message "the recording cannot be executed to this disc in the present recording mode" or the like is displayed, the user is notified of such a fact, and the disc is ejected. (S1608)

If it is determined in S1603 that the BDAV is not recorded, the recording can be executed. (S1605)

If the BD recorder has been set to a BDAV priority mode in S1602, whether or not the data of the BDMV format has already been recorded on the inserted BD is discriminated. (S1607)

If it is determined in S1607 that the BDMV has already been recorded, whether or not the coexistence flag showing whether or not the BDAV and the BDMV can coexist has been recorded on the BD is discriminated. (S1604)

If it is determined in S1604 that the coexistence flag exists, the recording can be executed. (S1605)

If it is determined in S1604 that the coexistence flag does not exist, since the inserted BD is a disc only for use of the BDMV recording, the recording cannot be executed. The message "the recording cannot be executed to this disc in the present recording mode" or the like is displayed, the user is notified of such a fact, and the disc is ejected. (S1608)

If it is determined in S1607 that the BDMV is not recorded, the recording can be executed. (S1605)

The discrimination about whether or not the data of the BDAV format has already been recorded can be made by, for example, discriminating whether or not the subdirectory BDAV 201 exists under the root directory and the info. bdav 202 has been recorded in the BDAV format.

The discrimination about whether or not the data of the BDMV format has already been recorded can be made by, for example, discriminating whether or not the subdirectory BDMV 101 exists under the root directory and the index. bdmv 102 has been recorded in the BDMV format.

For example, as shown in FIG. 18, the discrimination about the coexistence flag can be realized by discriminating whether or not the coexistence flag 1802 has been recorded under the root directory 1801.

That is, the discrimination about the coexistence flag can be realized by a method whereby in the case where the data of the BDAV format has already been recorded and the data is recorded by the BDMV without using the coexistence flag and in the case where the data of the BDMV format has already been recorded and the data is recorded by the BDAV, it is determined that the BDAV and the BDMV can coexist.

The recording permission/inhibition discriminating process is executed as mentioned above and this processing routine is finished. (S1606)

Subsequently to the discrimination about the recording permission/inhibition in FIG. 16, a recording starting process of FIG. 17 is executed in accordance with the following processing flow.

If it is decided that the BD inserted into the BD recorder can be recorded, this processing routine is started. (S1701)

First, the format which can be recorded to the BD is discriminated. (S1702)

If the recordable format is the BDMV, whether or not the data of the BDMV format has already been recorded is discriminated. (S1703)

If it is determined in S1703 that there is no BDMV, the BDMV format is recorded to the BD. (S1704)

The coexistence flag 1802 is recorded. (S1705)

The recording process is started. (S1706)

If it is determined in S1703 that the BDMV exists, the recording process is started in such a form as to additionally record the data to the existing BDMV. (S1706)

The recording starting process is executed as mentioned above and this processing routine is finished. (S1707)

There is such an effect that the user can easily perform the recording without being conscious of the format recorded on the BD as mentioned above.

Since it is sufficient to temporarily set either the BDMV priority mode or the BDAV priority mode into the BD recorder, there is such an effect that a troublesomeness upon discriminating of the recording format each time is reduced.

A construction in which the user is allowed to select the proper recording mode each time the BD is inserted in S1702 is also considered. In such a case, there is such an effect that the user can flexibly select the optimum format according to the program to be recorded or the disc.

In the case of recording data by the BDMV format for the first time onto the blank BD where no data is recorded and in the case of recording data by the BDAV format for the first time onto the blank BD where no data is recorded, by replacing the process of S1604 by a coexistence flag adding process, there is such an effect that even if the coexistence flag is not recorded, the data can be recorded by any one of the BDMV and the BDAV.

(2) Explanation of List Indication and Reproducing Process

The list indication and a reproducing procedure in the embodiment will now be described. It is assumed that in the list indication, all of the data are not always indicated on one display screen but a plurality of data are arranged and displayed on the screen.

First, the operation in which the clips recorded by the BDAV are list-indicated, desired clips are selected from the list and reproduced from the BD on which the subdirectory BDMV 101 and the subdirectory BDAV 201 have been recorded will be described.

Figure 19:
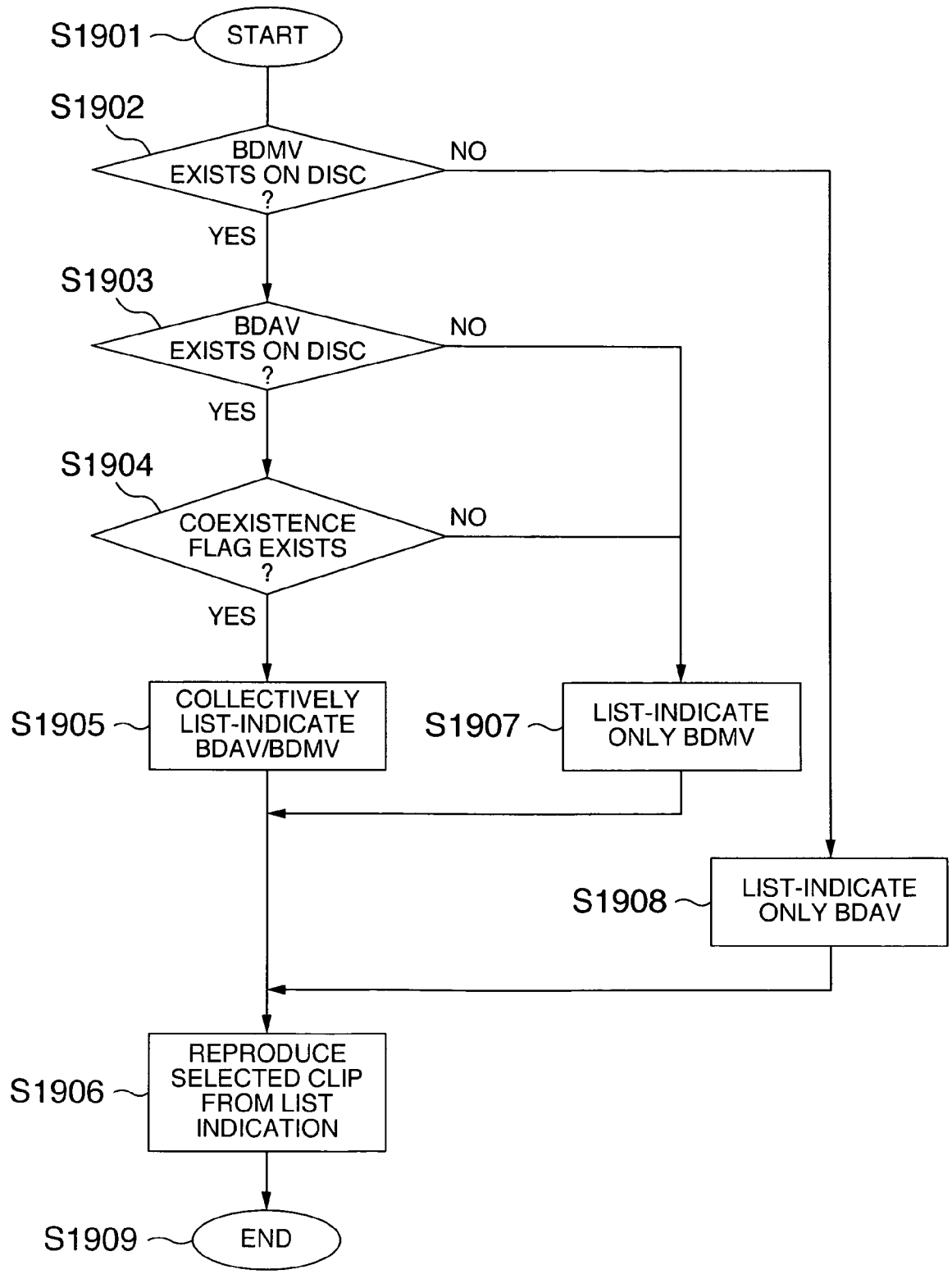
FIG. 19 is a flowchart showing an example of a processing flow in the case where the clips recorded on the BD are list-indicated and reproduced.

FIG. 19 is a flowchart of a processing flow in the case where the clips recorded on the BD are list-indicated and reproduced in the embodiment. In the diagram, S1901 . . . starting step S1902 . . . step of discriminating whether or not the BDMV format has been recorded on the BD S1903 . . . step of discriminating whether or not the BDAV format has been recorded on the BD S1904 . . . step of discriminating whether or not the coexistence flag has been recorded on the BD S1905 . . . step of collectively list-indicating the clips recorded by the BDMV format and the clips recorded by the BDAV format S1906 . . . step of selecting the clips to be reproduced from the indicated clip list and reproducing S1907 . . . step of list-indicating only the clips recorded by the BDMV format S1908 . . . step of list-indicating only the clips recorded by the BDAV format S1909 . . . finishing step The following five patterns are considered as patterns for list-indicating the clips on the BD That is, there are the following five patterns:

a case of list-indicating the clips on the BD where only the BDMV format has been recorded;

a case of list-indicating the clips on the BD where only the BDAV format has been recorded;

a case of list-indicating the clips of the BDMV format on the BD where the BDMV format and the BDAV format have been recorded;

a case of list-indicating the clips of the BDAV format on the BD where the BDMV format and the BDAV format have been recorded; and a case of list-indicating the clips of both of the BDMV format and the BDAV format on the BD where the BDMV format and the BDAV format have been recorded.

In the case of list-indicating the clips on the BD by the above five patterns, the following processing flow is executed.

When the BD is inserted into the BD recorder, this processing routine is started. (S1901)

First, whether or not the data of the BDMV format has already been recorded on the inserted BD is discriminated. (S1902)

If it is determined in S1902 that the data of the BDMV has already been recorded, whether or not the data of the BDAV has already been recorded on the inserted BD is discriminated. (S103)

If it is determined in S1903 that the data of the BDAV format has already been recorded, whether or not the coexistence flag showing whether or not the BDAV and the BDMV can coexist has been recorded on the BD is discriminated. (S1904)

If it is determined in S1904 that the coexistence flag exists, the clips of both of the BDMV format and the BDAV format are list-indicated. (S1905)

If it is determined in S1902 that the data of the BDMV format is not recorded, the clips of the BDAV format are list-indicated. (S1908)

If it is determined in S1903 that the data of the BDAV format is not recorded, the clips of the BDMV format are list-indicated. (S1907)

The clip list indicating process and the reproduction starting process are executed as mentioned above and this processing routine is finished. (S1909)

An indicating method of list-indicating the clips on the BD will now be described with reference to FIGS. 4 to 15.

The first method is shown.

Figure 4:
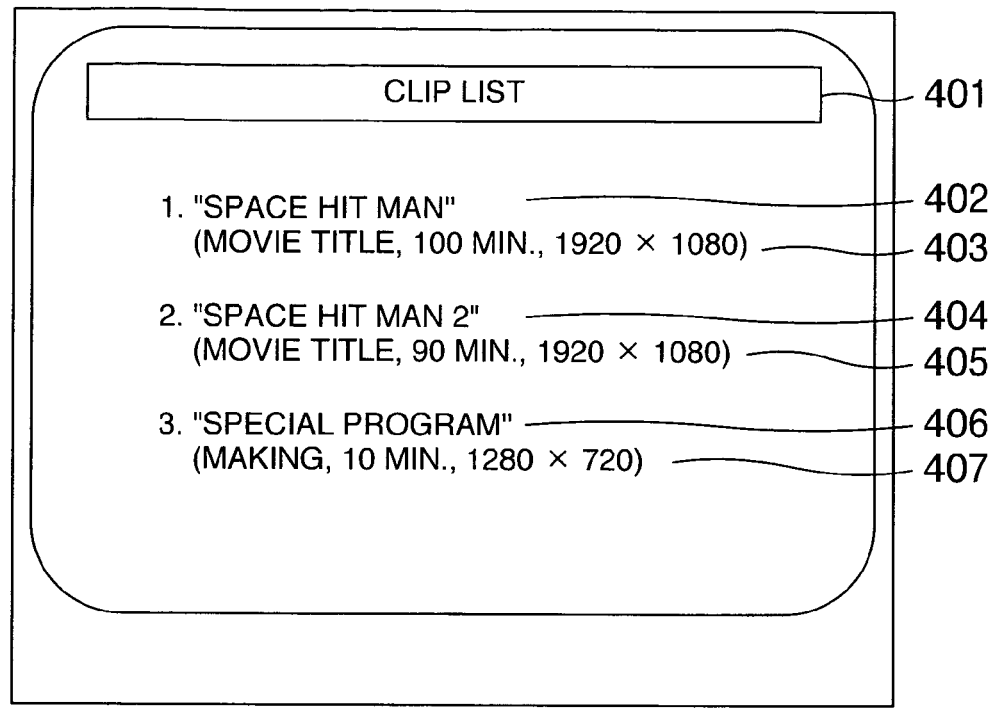
FIG. 4 is a diagram showing an example of indication of a list of clips of the BDAV format recorded on the BD.

FIG. 4 is a diagram showing an example of indication of the list of clips of the BDAV format recorded on the BD. In the diagram,

401 . . . title of list indication

402 . . . title of the first clip

403 . . . information of the first clip

404 . . . title of the second clip

405 . . . information of the second clip

406 . . . title of the third clip

407 . . . information of the third clip

The title of list indication (401) shows that the display screen is a screen to indicate the list of clips recorded on the BD.

The title 402 shows that the title of the first clip is "space hit man".

The clip information 403 shows that the type of first clip is a movie title, a recording time is equal to 100 minutes, and a display resolution corresponds to a high vision resolution of (1920 pixels in the lateral direction)×(1080 pixels in the vertical direction).

The title 404 shows that the title of the second clip is "space hit man 2".

The clip information 405 shows that the type of second clip is a movie title, a recording time is equal to 90 minutes, and a display resolution corresponds to a high vision resolution of (1920 pixels in the lateral direction)×(1080 pixels in the vertical direction).

The title 406 shows that the title of the third clip is "special program".

The clip information 407 shows that the type of third clip is a making program, a recording time is equal to 10 minutes, and a display resolution corresponds to a high vision resolution of (1280 pixels in the lateral direction)×(720 pixels in the vertical direction).

The above list indication an indicating method which is used in the case of list-indicating only the BDAV from the BD on which the BDAV and the BDMV have been recorded and is unique to a reproducing device. It is an indicating method different from a menu indication recorded on the disc.

In the case of the BD having a simple menu, it is also considered that the BD holds the list indication with such a construction.

Figure 5:
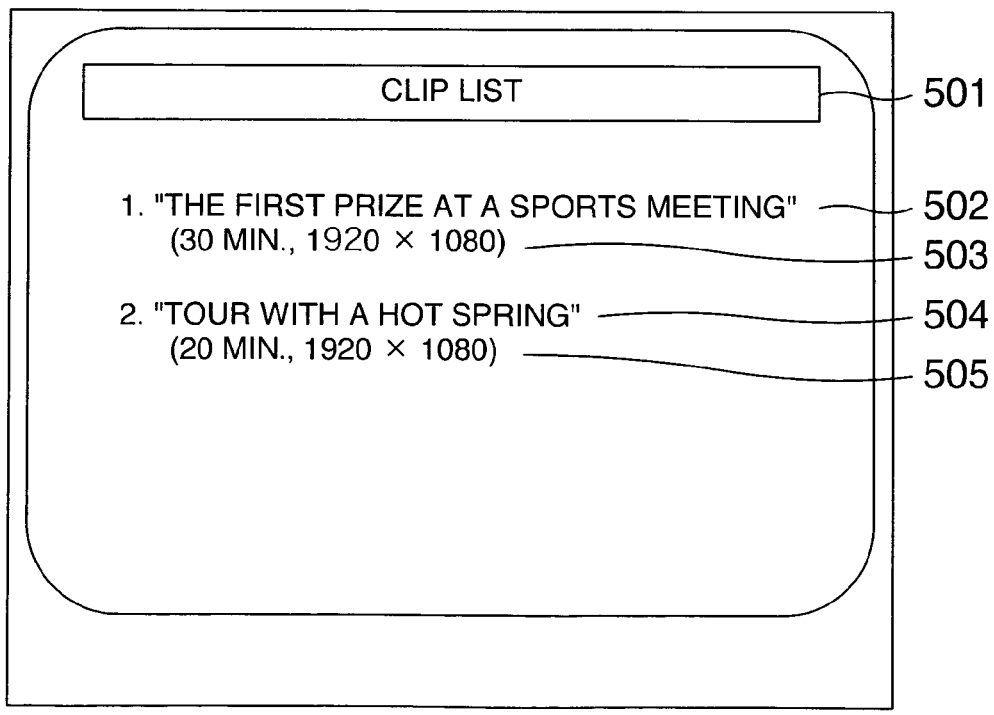
FIG. 5 is a diagram showing an example of indication of a list of clips of a BDMV format recorded on the BD.

FIG. 5 is a diagram showing an example of indication of a list of clips of the BDMV format recorded on the BD. In the diagram,

501 . . . title of the list indication

502 . . . title of the first clip

503 . . . information of the first clip

504 . . . title of the second clip

505 . . . information of the second clip

The title of the list indication (501) shows that the display screen is a screen to display a list of clips recorded on the BD.

The title of the first clip (502) shows that the title of the first clip is "the first prize at a sports meeting".

The information of the first clip (503) shows that a recording time of the first clip is equal to 30 minutes and a display resolution corresponds to a high vision resolution of (1920 pixels in the lateral direction)×(1080 pixels in the vertical direction).

The title of the second clip (504) shows that the title of the second clip is "tour with a hot spring".

The information of the second clip (505) shows that a recording time of the second clip is equal to 20 minutes and a display resolution corresponds to a high vision resolution of (1920 pixels in the lateral direction)×(1080 pixels in the vertical direction).

This list indication is an indicating method which is used in the case of list-indicating only the BDMV from the BD on which the BDAV and the BDMV have been recorded and is unique to the reproducing device. It is an indicating method different from the menu indication recorded on the disc.

In the case of the BD having the simple menu, it is also considered that the BD holds the list indication with such a construction.

Figure 6:
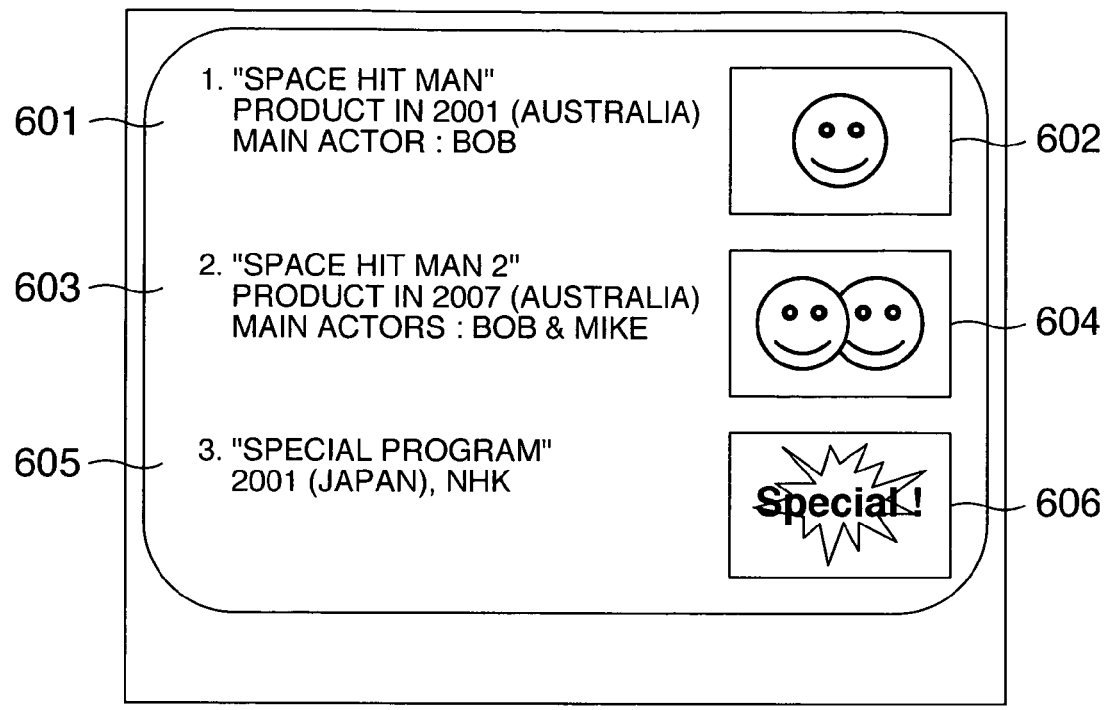
FIG. 6 is a diagram showing another example of indication of a list of clips of the BDAV format recorded on the BD.

FIG. 6 is a diagram showing another example of indication of a list of clips of the BDAV format recorded on the BD. In the diagram, 601 . . . title of the first clip and its clip information
602 . . . thumbnail image of the first clip
603 . . . title of the second clip and its clip information
604 . . . thumbnail image of the second clip
605 . . . title of the third clip and its clip information
606 . . . thumbnail image of the third clip The title of the first clip and its clip information (601) shows that the title of the first clip is "space hit man", this movie is a product of Australia produced in 2001, and the name of a leading actor is Bob.

The thumbnail image of the first clip (602) indicates the thumbnail of the first clip.

The title of the second clip and its clip information (603) shows that the title of the second clip is "space hit man 2", this movie is a product of Australia produced in 2007, and the names of leading actors are Bob and Mike.

The thumbnail image of the second clip (604) indicates the thumbnail of the second clip.

The title of the third clip and its clip information (605) shows that the title of the third clip is "special program", this program is a product produced in 2001 by NHK in Japan.

The thumbnail image of the third clip (606) indicates the thumbnail of the third clip.

This list indication is a general indication which is used in the case of list-indicating the BD on which only the BDAV has been recorded.

In the case of the BD having a rich menu, it is also considered that the BD holds the list indication with such a construction.

Figure 7:
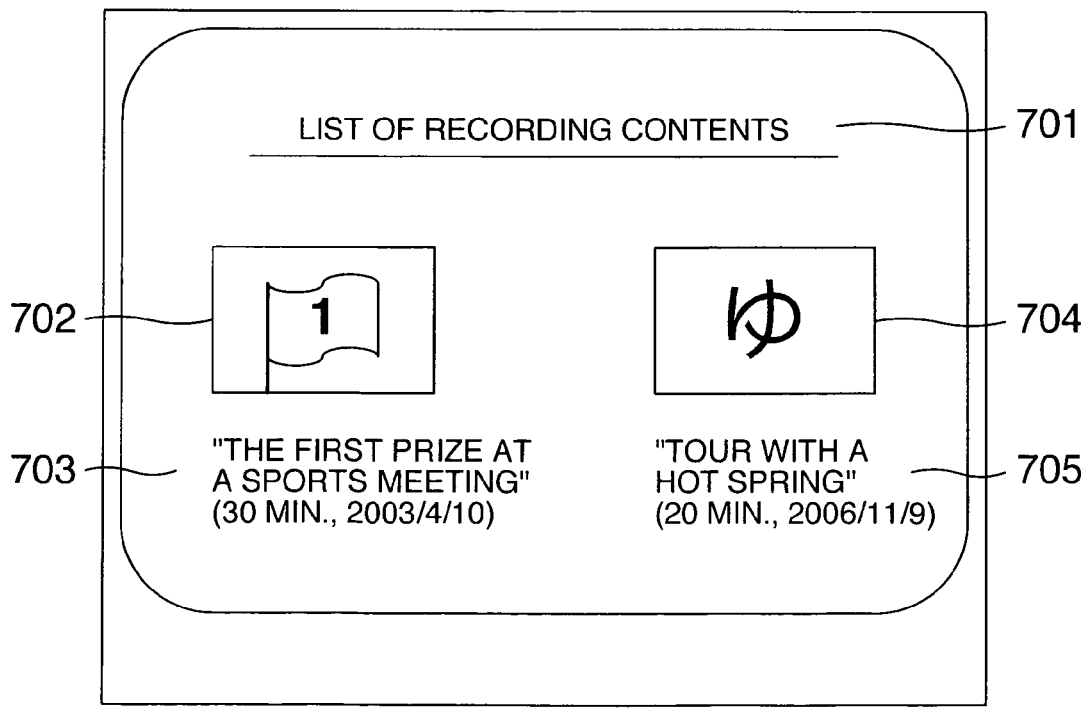
FIG. 7 is a diagram showing another example of indication of a list of clips of the BDMV format recorded on the BD.

FIG. 7 is a diagram showing another example of indication of a list of clips of the BDMV format recorded on the BD. In the diagram, 701 . . . title of the list indication
702 . . . thumbnail image of the first clip
703 . . . title of the first clip and its clip information
704 . . . thumbnail image of the second clip
705 . . . title of the second clip and its clip information The title of the list indication (701) shows that the display screen is a screen to display a list of clips recorded on the BD.

The thumbnail image of the first clip (702) indicates the thumbnail of the first clip.

The title of the first clip and its clip information (703) shows that the title of the first clip is "the first prize at a sports meeting", a recording time is equal to 30 minutes, and a recording or photographing date is Apr. 10, 2003.

The thumbnail image of the second clip (704) indicates the thumbnail of the second clip.

The title of the second clip and its clip information (705) shows that the title of the second clip is "tour with a hot spring", a recording time is equal to 20 minutes, and a recording date is Nov. 9, 2006.

This list indication is a general indication which is used in the case of list-indicating the BD on which only the BDAV has been recorded.

In the case of the BD having a rich menu, it is also considered that the BD holds the list indication with such a construction.

Figure 8:
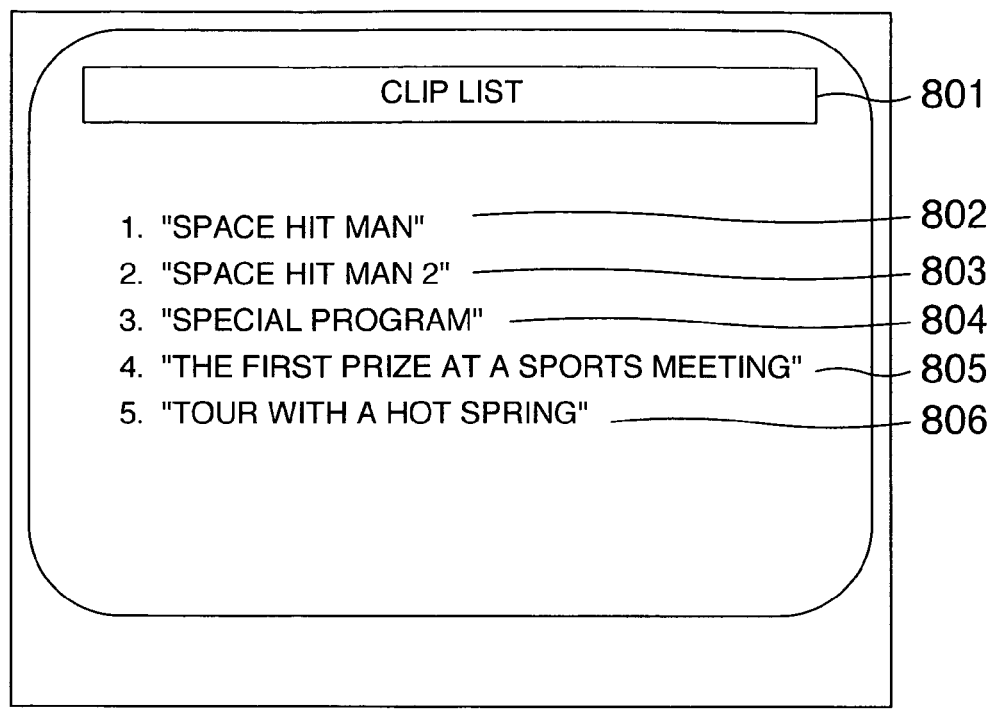
FIG. 8 is a diagram showing an example of indication in the case where the clips of the BDAV format and the clips of the BDMV format recorded on the BD are collectively list-indicated.

FIG. 8 is a diagram showing an example of indication in the case where the clips of the BDAV format and the clips of the BDMV format recorded on the BD are collectively list-indicated. In the diagram, 801 . . . title of the list indication
802 . . . title of the first clip
803 . . . title of the second clip
804 . . . title of the third clip
805 . . . title of the fourth clip
806 . . . title of the fifth clip The title of the list indication (801) shows that the display screen is a screen to display a list of clips recorded on the BD.

The title of the first clip (802) shows that the title of the first clip is "space hit man".

The title of the second clip (803) shows that the title of the second clip is "space hit man 2".

The title of the third clip (804) shows that the title of the third clip is "special program".

The title of the fourth clip (805) shows that the title of the fourth clip is "the first prize at a sports meeting".

The title of the fifth clip (805) shows that the title of the fifth clip is "tour with a hot spring".

This list indication is used in the case of list-indicating the BD on which the BDMV and the BDAV have been recorded.

In the case of the BD having a simple menu, it is also considered that the list indication as shown in FIG. 4 has been held in the BDAV format. In such a case, as shown in FIG. 8, it is considered that the clips of the BDMV and the BDAV are collectively indicated in the BDAV format.

By such an indicating method, since a troublesomeness upon switching of the BDAV mode and the BDMV mode can be reduced and the lists of clips unified in the BDAV mode and the BDMV mode can be indicated, there is such an effect that the lists are easy to see and all of the clips recorded on the disc can be rapidly confirmed and easily managed.

The second method will now be described.

Figure 9:
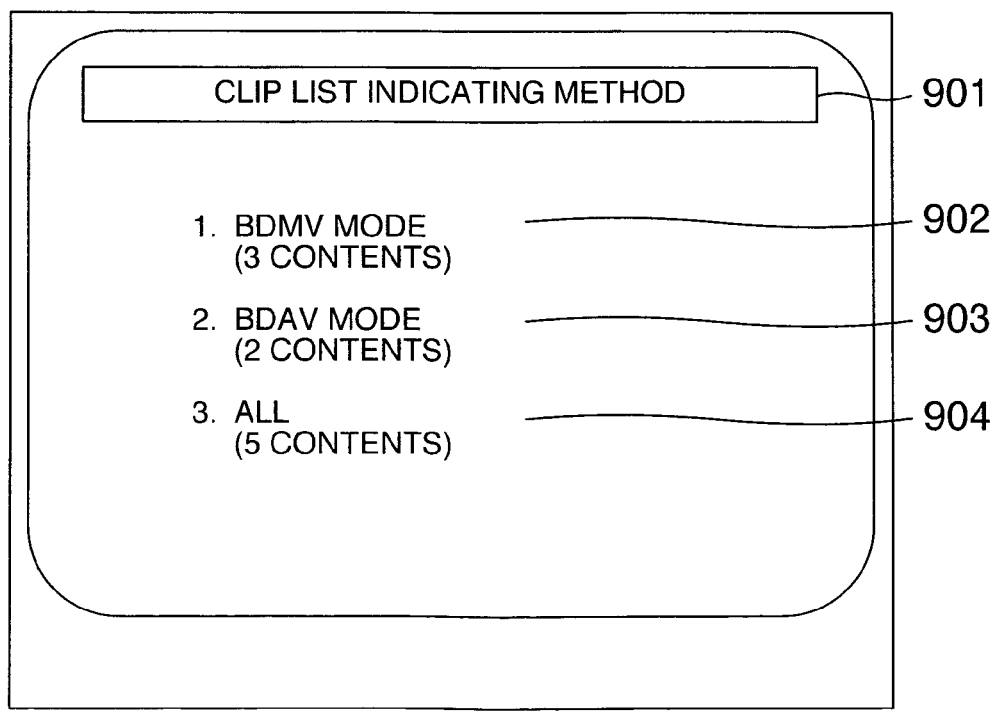
FIG. 9 is a diagram showing another example of indication in the case where the clips of the BDAV format and the clips of the BDMV format recorded on the BD are collectively list-indicated.

FIG. 9 is a diagram showing another example of indication in the case where the clips of the BDAV format and the clips of the BDMV format recorded on the BD are collectively list-indicated. In the diagram, 901 . . . title of the list indication
902 . . . the first indicating method
903 . . . the second indicating method
904 . . . the third indicating method The title of the list indication (901) shows that the display screen is a screen to display a list of clips recorded on the BD.

The first indicating method 902 is a mode for displaying the clips recorded in the BDMV format and shows that three contents have been recorded by the BDMV.

The second indicating method 903 is a mode for displaying the clips recorded in the BDAV format and shows that two contents have been recorded by the BDAV.

The third indicating method 904 is a mode for displaying all of the clips recorded in the BDMV format and the BDAV format and shows that five contents in total have been recorded.

Figure 10:
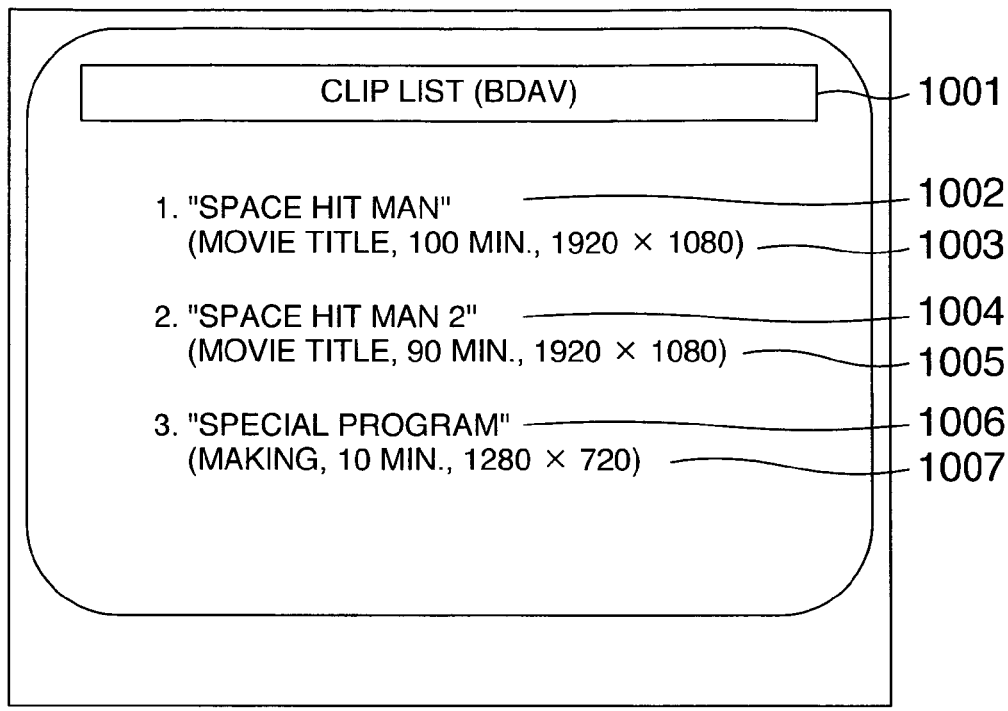
FIG. 10 is a diagram showing an example of indication in the case where the clips of the BDAV format are list-indicated after a BDAV mode was selected.

FIG. 10 is a diagram showing an example of indication in the case where the clips of the BDAV format are list-indicated after the BDAV mode was selected in FIG. 9. In the diagram, 1001 . . . title of the list indication
1002 . . . title of the first clip 1003 . . . information of the first clip
1004 . . . title of the second clip
1005 . . . information of the second clip
1006 . . . title of the third clip
1007 . . . information of the third clip The title of the list indication (1001) shows that the display screen is a screen to display a list of clips recorded on the BD.

The title 1002 shows that the title of the first clip is "space hit man".

The clip information 1003 shows that the type of first clip is a movie title, a recording time is equal to 100 minutes, and a display resolution corresponds to a high vision resolution of (1920 pixels in the lateral direction)×(1080 pixels in the vertical direction).

The title 1004 shows that the title of the second clip is "space hit man 2".

The clip information 1005 shows that the type of second clip is a movie title, a recording time is equal to 90 minutes, and a display resolution corresponds to a high vision resolution of (1920 pixels in the lateral direction)×(1080 pixels in the vertical direction).

The title 1006 shows that the title of the third clip is "special program".

The clip information 1007 shows that the type of third clip is a making program, a recording time is equal to 10 minutes, and a display resolution corresponds to a high vision resolution of (1280 pixels in the lateral direction)×(720 pixels in the vertical direction).

Figure 11:
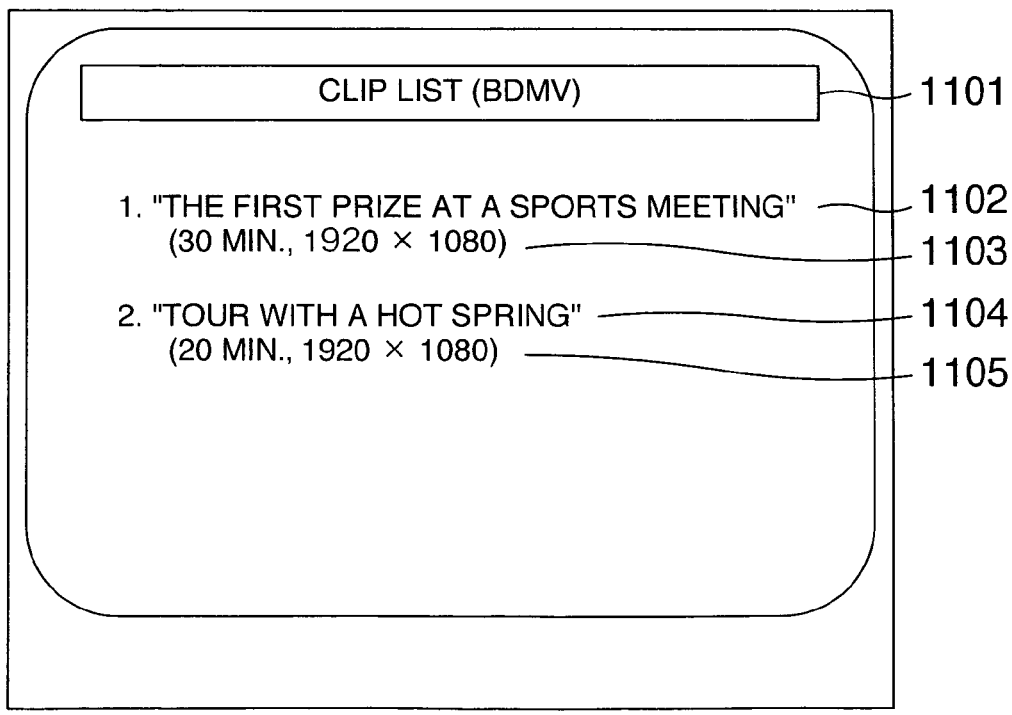
FIG. 11 is a diagram showing an example of indication in the case where the clips of the BDMV format are list-indicated after a BDMV mode was selected.

FIG. 11 is a diagram showing an example of indication in the case where the clips of the BDMV format are list-indicated after a BDMV mode was selected in FIG. 9. In the diagram, 1101 . . . title of the list indication
1102 . . . title of the first clip
1103 . . . information of the first clip
1104 . . . title of the second clip
1105 . . . information of the second clip The title of the list indication (1101) shows that the display screen is a screen to display a list of clips recorded on the BD.

The title of the first clip (1102) shows that the title of the first clip is "the first prize at a sports meeting".

The clip information of the first clip (1103) shows that a recording time of the first clip is equal to 30 minutes and a display resolution corresponds to a high vision resolution of (1920 pixels in the lateral direction)×(1080 pixels in the vertical direction).

The title of the second clip (1104) shows that the title of the second clip is "tour with a hot spring".

The clip information of the second clip (1105) shows that a recording time of the second clip is equal to 20 minutes and a display resolution corresponds to a high vision resolution of (1920 pixels in the lateral direction)×(1080 pixels in the vertical direction).

Figure 12:
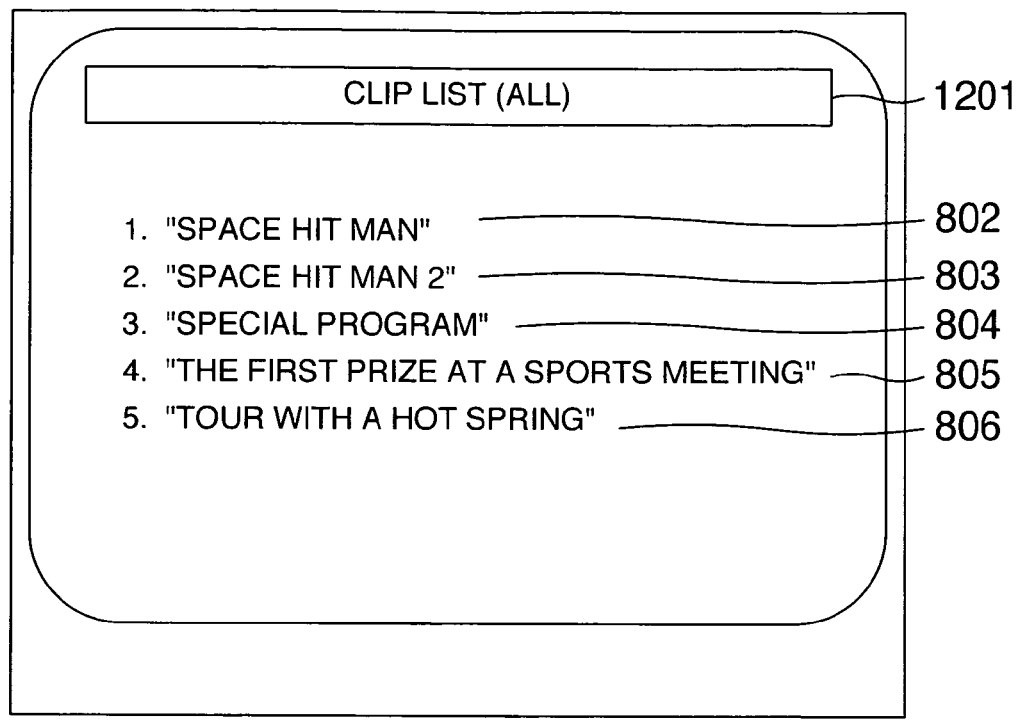
FIG. 12 is a diagram showing an example of indication in the case where the clips of the BDAV format and the clips of the BDMV format are collectively list-indicated after a mode for indicating all of the clips was selected.

FIG. 12 is a diagram showing an example of indication in the case where the clips of the BDAV format and the clips of the BDMV format are collectively list-indicated after a mode for indicating all of the clips was selected in FIG. 9. In the diagram, 1201 . . . title of the list indication Since reference numerals 802 to 806 denote the same titles as those shown in FIG. 8, their explanation is omitted here.

Those list indications are indicating methods which are used in the case of list-indicating only the BDMV from the BD on which the BDAV and the BDMV have been recorded and are unique to the reproducing device. They are indicating methods different from the menu indication recorded on the disc.

By those indicating methods, since the user can select a desired one of the BDAV mode, the BDMV mode, and the all-clip indicating mode, easily execute the switching operation of them, and indicate the lists of clips unified in the BDAV mode and the BDMV mode, there is such an effect that the lists are easy to see and all of the clips recorded on the disc can be rapidly confirmed and easily managed.

The third method will now be explained.

Figure 13:
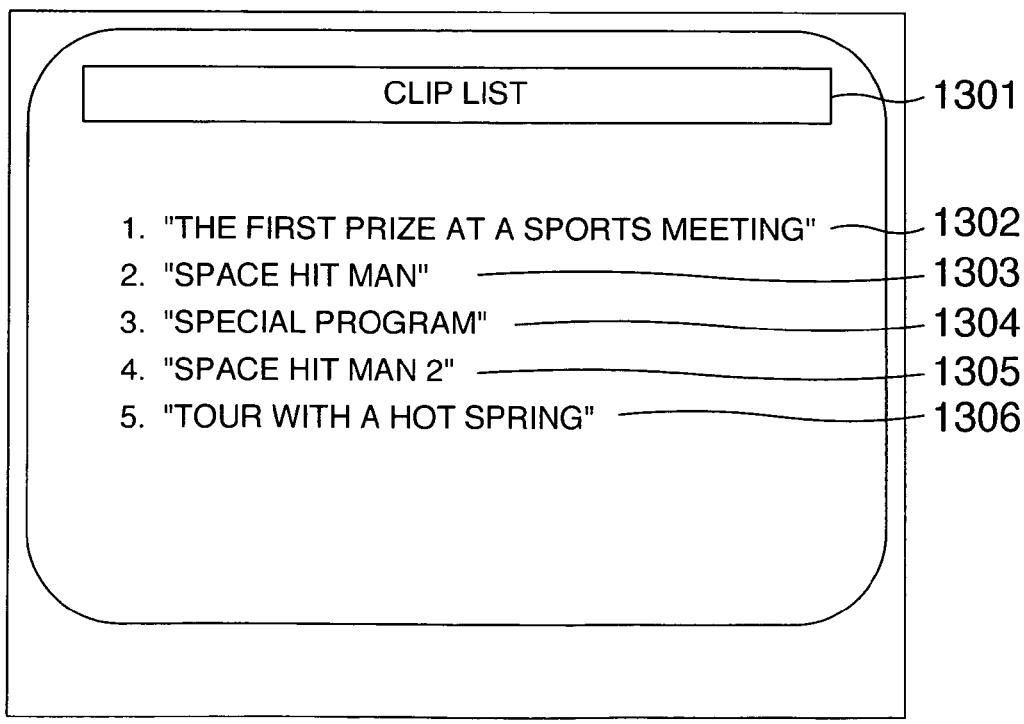
FIG. 13 is a diagram showing an example of indication in the case where the clips of the BDAV format and the clips of the BDMV format recorded on the BD are collectively list-indicated in order of recording time.

FIG. 13 is a diagram showing an example of indication in the case where the clips of the BDAV format and the clips of the BDMV format recorded on the BD are collectively list-indicated in order of recording time. In the diagram, 1301 . . . title of the list indication
1302 . . . title of the first clip
1303 . . . title of the second clip
1304 . . . title of the third clip
1305 . . . title of the fourth clip
1306 . . . title of the fifth clip The title of the list indication (1301) shows that the display screen is a screen to display a list of clips recorded on the BD.

The title of the first clip (1302) shows that the title of the first clip is "the first prize at a sports meeting".

The title of the second clip (1303) shows that the title of the second clip is "space hit man". The title of the second clip (1304) shows that the title of the third clip is "special program".

The title of the fourth clip (1305) shows that the title of the fourth clip is "space hit man 2".

The title of the fifth clip (1306) shows that the title of the fifth clip is "tour with a hot spring".

This list indications is an indicating method which is used in the case of list-indicating the BD on which the BDAV and the BDMV have been recorded and is unique to the reproducing device. It is an indicating method different from the menu indication recorded on the disc.

By such an indicating method, since a troublesomeness upon switching of the BDAV mode and the BDMV mode can be reduced and the lists of clips unified in the BDAV mode and the BDMV mode can be indicated, there is such an effect that the lists are easy to see and all of the clips recorded on the disc can be rapidly and time-sequentially confirmed and easily managed.

The fourth method will now be described.

Figure 14:
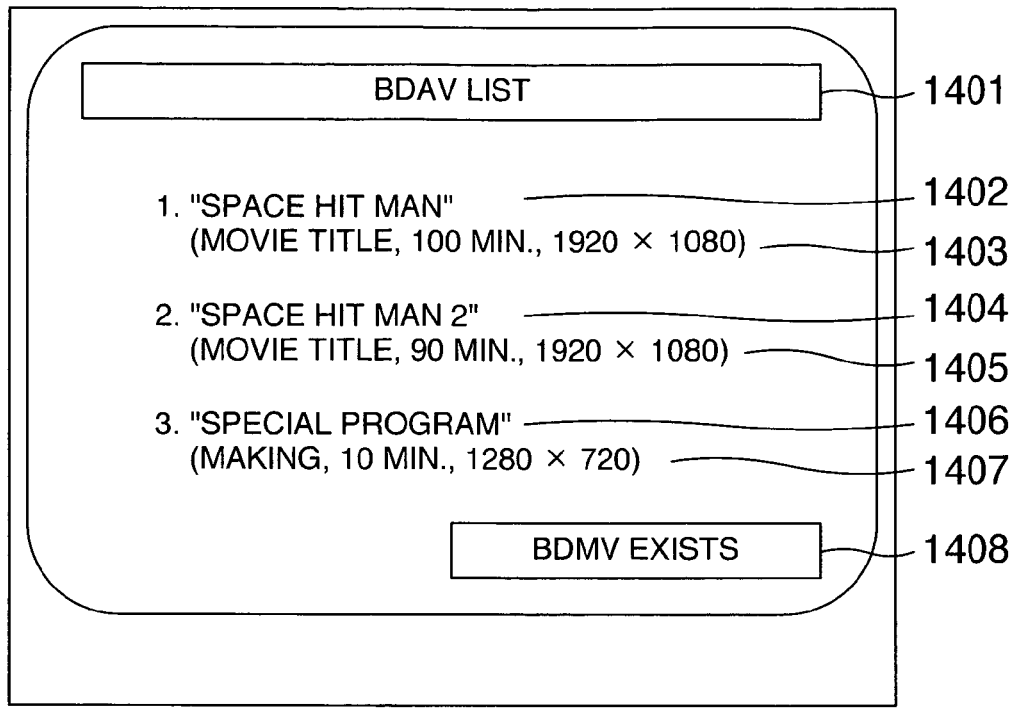
FIG. 14 is a diagram showing an example of indication in the case where the clips of the BDAV format among the clips of the BDAV format and the clips of the BDMV format recorded on the BD are list-indicated and, at the same time, a button to switch an indicating mode to the list indication of the clips of the BDMV format is indicated.

FIG. 14 is a diagram showing an example of indication in the case where the clips of the BDAV format among the clips of the BDAV format and the clips of the BDMV format recorded on the BD are list-indicated and, at the same time, a button to switch an indicating mode to the list indication of the clips of the BDMV format is indicated. In the diagram, 1401 . . . title of the list indication
1402 . . . title of the first clip
1403 . . . information of the first clip
1404 . . . title of the second clip
1405 . . . information of the second clip
1406 . . . title of the third clip
1407 . . . information of the third clip
1408 . . . clip list indicating button of the BDMV format The title of the list indication (1401) shows that the display screen is a screen to display a list of clips recorded on the BD.

The title 1402 shows that the title of the first clip is "space hit man".

The clip information 1403 shows that a type of first clip is a movie title, a recording time is equal to 100 minutes, and a display resolution corresponds to a high vision resolution of (1920 pixels in the lateral direction)×(1080 pixels in the vertical direction).

The title 1404 shows that the title of the second clip is "space hit man 2".

The clip information 1405 shows that a type of second clip is a movie title, a recording time is equal to 90 minutes, and a display resolution corresponds to a high vision resolution of (1920 pixels in the lateral direction)×(1080 pixels in the vertical direction).

The title 1406 shows that the title of the third clip is "special program".

The clip information 1407 shows that a type of third clip is a making program, a recording time is equal to 10 minutes, and a display resolution corresponds to a high vision resolution of (1280 pixels in the lateral direction)×(720 pixels in the vertical direction).

The button 1408 to list-indicate the clips of the BDMV format shows that not only the clips of the BDAV format but also the clips of the BDMV format have been recorded on the BD. By clicking this button, the indicating mode can be switched to the clip list indication of the BDMV format shown in FIG. 15.

Figure 15:
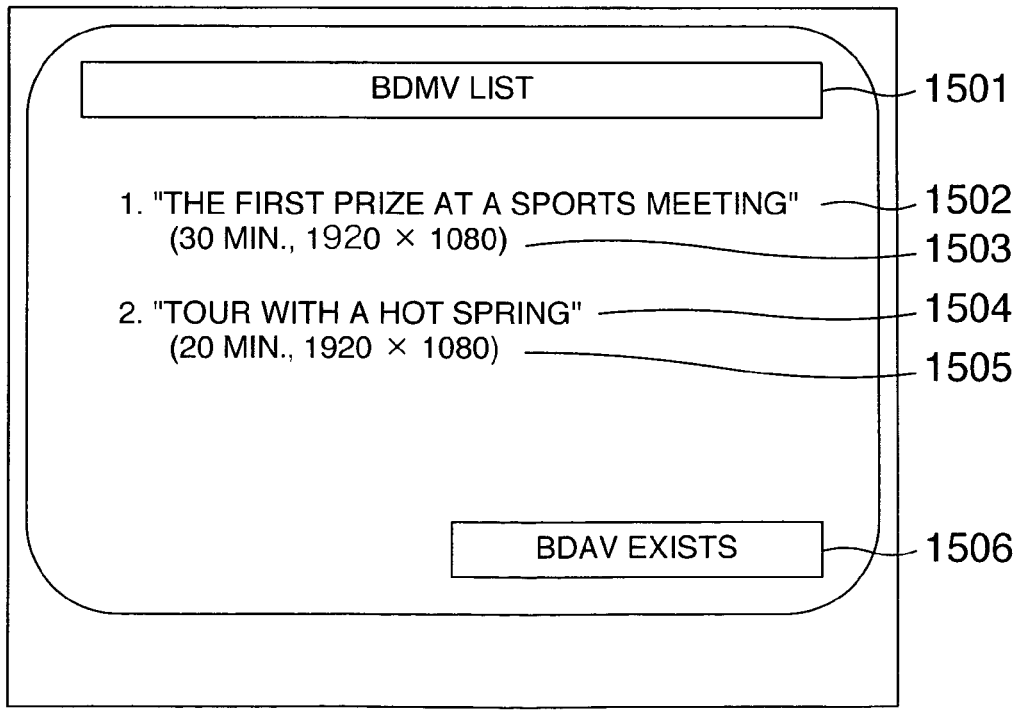
FIG. 15 is a diagram showing an example of indication in the case where the clips of the BDMV format among the clips of the BDAV format and the clips of the BDMV format recorded on the BD are list-indicated and, at the same time, a button to switch an indicating mode to the list indication of the clips of the BDAV format is indicated.

FIG. 15 is a diagram showing an example of indication in the case where the clips of the BDMV format among the clips of the BDAV format and the clips of the BDMV format recorded on the BD are list-indicated and, at the same time, a button to switch the indicating mode to the list indication of the clips of the BDAV format is indicated. In the diagram,

1501 ... title of the list indication
1502 ... title of the first clip
1503 ... information of the first clip
1504 ... title of the second clip
1505 ... information of the second clip
1506 ... clip list indicating button of the BDAV format The title of the list indication (1501) shows that the display screen is a screen to display a list of clips recorded on the BD.

The title of the first clip (1502) shows that the title of the first clip is "the first prize at a sports meeting".

The clip information of the first clip (1503) shows that a recording time of the first clip is equal to 30 minutes and a display resolution corresponds to a high vision resolution of (1920 pixels in the lateral direction)×(1080 pixels in the vertical direction).

The title the second clip (1504) shows that the title of the second clip is "tour with a hot spring".

The information of the second clip (1505) shows that a recording time of the second clip is equal to 20 minutes and a display resolution corresponds to a high vision resolution of (1920 pixels in the lateral direction)×(1080 pixels in the vertical direction).

The button 1506 to list-indicate the clips of the BDAV format shows that not only the clips of the BDMV format but also the clips of the BDAV format have been recorded on the BD. By clicking this button, the indicating mode can be switched to the clip list indication of the BDAV format shown in FIG. 14.

The BD recorder according to the embodiment will be finally explained.

Figure 20:
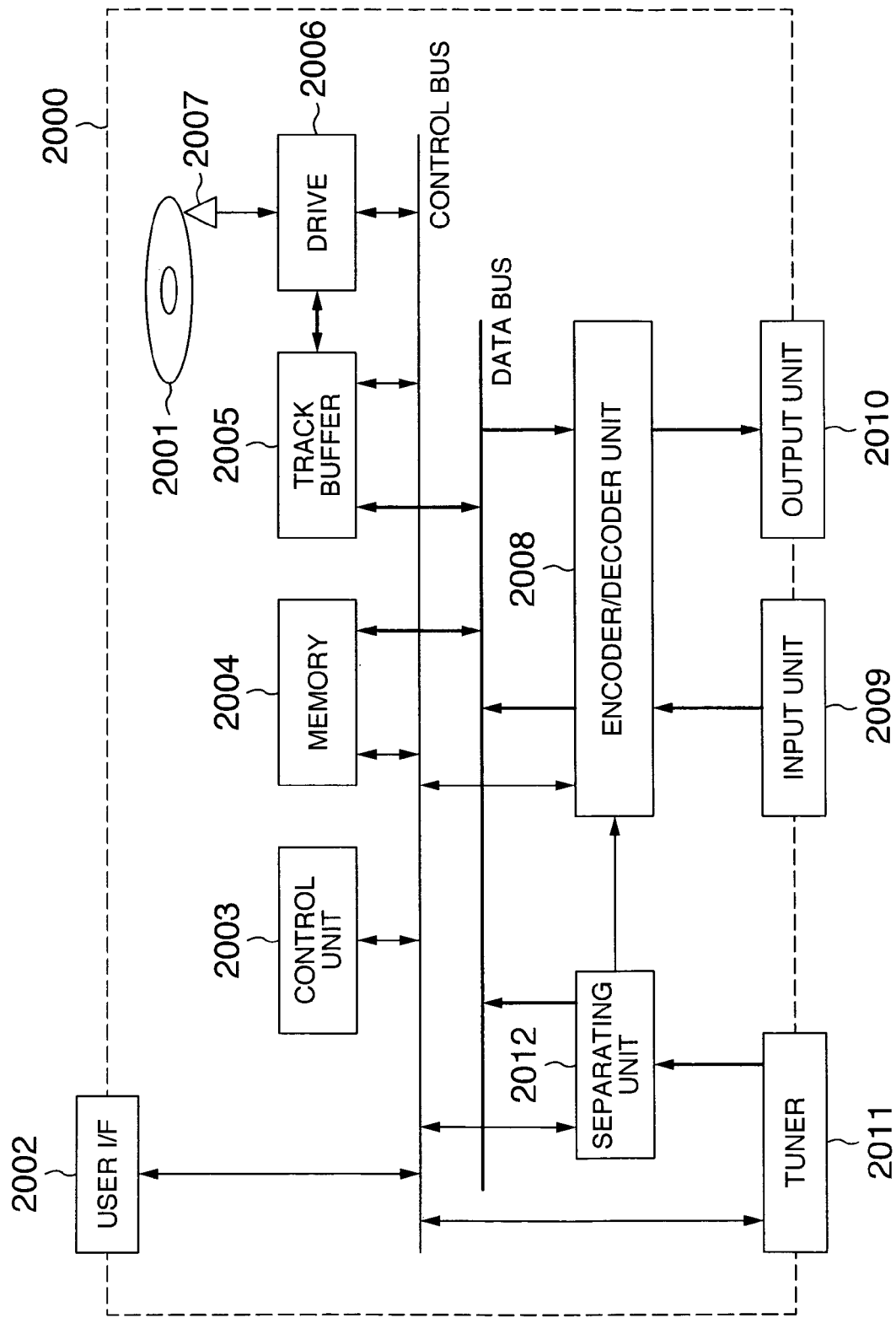
FIG. 20 is a block diagram showing an example of a construction of a BD recorder.

FIG. 20 shows a block diagram of an example of the BD recorder of the embodiment. In the diagram,

2000 ... BD recorder
2001 ... BD
2002 ... user I/F
2003 ... control unit
2004 ... memory
2005 ... track buffer
2006 ... drive
2007 ... pickup
2008 ... encoder/decoder unit
2009 ... input unit
2010 ... output unit
2011 ... tuner
2012 ... separating unit The BD recorder 2000 has the BD 2001, user I/F 2002, control unit 2003, memory 2004, track buffer 2005, drive 2006, pickup 2007, encoder/decoder unit 2008, input unit 2009, and output unit 2010.

The BD 2001 is a rewritable optical disc which can record a video/audio signal in the BDMV format or the BDAV format at high quality.

The user I/F 2002 is a section including buttons, an FL display tube, and a remote control photosensing unit provided for the main body of the BD recorder 2000. The user I/F 2002 fetches an instruction from the user to the recorder and displays notification information to the user.

The control unit 2003 controls the BD recorder 2000, makes settings of the encoder/decoder unit 2008, and controls the reading and writing operations of the drive 2006.

The memory 2004 is a work memory such as an SDRAM or the like which is used as a work area of the control unit 2003.

The track buffer 2005 is a buffer for R/W (reading/writing) from/to the drive 2006 and is constructed by a memory of a large capacity such as an SDRAM or the like.

The drive 2006 is an optical drive which can R/W (read/write) the BD.

The pickup 2007 is built in the drive 2006 and R/W (reads/writes) data from/to the BD 2001 by irradiating a laser beam to the BD 2001.

The encoder/decoder unit 2008 encodes the video/audio signal inputted from the outside of the BD recorder 2000 or decodes an MPEG stream or H.264 stream read out of the BD 2001, thereby decoding the video/audio signal which is outputted to the outside of the BD recorder 2000.

The input unit 2009 inputs the analog video/audio signal from the outside of the BD recorder 2000.

The output unit 2010 outputs the analog video/audio signal and an OSD indication such as a clip list indication or the like to the outside of the BD recorder 2000.

The tuner 2011 receives a digital broadcasting from the outside of the BD recorder 2000 and inputs it.

The separating unit 2012 separates the digital signal inputted from the tuner 2011 and fetches only the necessary data.

A flow of the data in the case of performing the clip list indication by the BD recorder will now be described.

The control unit 2003 accesses the BD 2001 set into the drive 2006 and reads out information showing that the clips have been recorded in the BDMV format or the BDAV format.

The read-out data is temporarily stored into the track buffer 2005. The necessary information in the data is fetched into the memory 2004 and whether or not the clips have been recorded in the BDMV format or the BDAV format is discriminated.

In the case of collectively list-indicating the clips of the BDMV format and the BDAV format, the clip information of the BDMV format and the clip information of the BDAV format are converted into a clip list indicating format that is unique to the BD recorder 2000 or a clip list indicating format of the BDAV format and OSD indication data is formed in the memory 2004 on the basis of the converted clip list indicating format.

Further, the OSD indication data is outputted from the output unit 2010 through the encoder/decoder unit 2008.

In the case of recording the data of the BDMV format or the BDAV format onto the BD 2001, the control unit 2003 controls so as to temporarily form a data structure of the BDMV format or the BDAV format into the memory 2004, write it as a disc image into the track buffer 2005, and allow the drive 2006 to record the completed disc image onto the BD 2001 on a sector unit basis.

In the case of a BD camera, it has a construction obtained by excluding the tuner 2011 and the separating unit 2012 from the construction of the BD recorder mentioned above.

In the case of a BD player, it has a construction in which the tuner 2011 and the separating unit 2012 are excluded from the construction of the BD recorder mentioned above and the encoder/decoder unit 2008 is replaced by only the decoder.

According to the embodiment, for example, there is such an effect that the user can easily view all of the clips on the disc without being conscious of the format recorded on the disc and searching performance is improved.

According to the embodiment, for example, there is such an effect that the user can easily perform the reproduction without being conscious of the format recorded on the disc.

According to the embodiment, for example, there is such an effect that the user can easily record without being conscious of the format recorded on the disc and without confusing the recording format.

According to the embodiment, for example, there is such an effect that by using the high-compressing technique such as an H.264 standard as a function that is peculiar to the BDMV, the user can perform the long-time recording even to the disc recorded by the BDAV.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data reproducing method of reproducing data having been recorded on a recording medium, comprising the steps of:
    recording data on said recording medium, said data including a first data group and a second data group, said first data group being recorded under a subdirectory, which is under an upper directory higher than the subdirectory, onto said recording medium in accordance with a BDAV recording format, said second data group being recorded under another subdirectory, which is under the upper directory higher than the other subdirectory, onto said recording medium in accordance with a BDMV recording format different from said BDAV recording format, said first recording data group including first list indication data which is used for a first list indicating method applicable to data under the BDAV recording format, said second recording data group including second list indication data which is used for a second list indicating method applicable to data under the BDMV recording format, different from said first list indicating method, said first list indication data corresponding to said first data group, and said second list indication data corresponding to said second data group
    recording, on the recording medium, information on a flag for performing the first data group and the second data group to be list-indicated, wherein the flag includes a coexistence flag which indicates coexistence of the subdirectory and the other subdirectory, and the coexistence flag is stored as a file under the subdirectory or the other subdirectory;
    reproducing the information on the flag; and
    list-indicating said first data group and said second data group according to the information reproduced, wherein said first data group and said second data group are collectively list-indicated if the coexistence flag is detected.

2. A data recording device for recording data onto a recording medium, comprising:
    a data recording unit for recording the data; and
    a control unit for controlling the data recording unit and the recording medium, wherein:
    the control unit is configured to control the recording medium so as to record said data including at least a first data group and a second data group, said first data group being recorded under a subdirectory, which is under an upper directory higher than the subdirectory, onto the recording medium in accordance with a BDAV recording format, and said second data group being recorded under another subdirectory, which is under the upper directory higher than the other subdirectory, onto the recording medium in accordance with a BDMV recording format different from said first recording format, said first recording data group including first list indication data for a first list indicating method applicable to data under the BDAV recording format, and said second recording data group including second list indication data for a second list indicating method, said first list indication data indicating said first data group and said second list indication data indicating said second data group, and
    the control unit controls the recording medium so as to send a coexistence flag for permitting the first data group and the second data group to be list-indicated when the second data group is to be recorded onto the recording medium on which the first data group has been already recorded, and to record the second data group, wherein:
    the coexistence flag indicates coexistence of the subdirectory and the other subdirectory,
    the coexistence flag is stored as a file under the subdirectory or the other subdirectory, and
    said first data group and said second data group are collectively list-indicated if the coexistence flag is detected.

3. A data reproducing device for reproducing data having been recorded on a recording medium, comprising:
    a data reproducing unit for reproducing the data; and
    a control unit for controlling the data reproducing unit and the recording medium; wherein:
    the control unit controls the recording medium so as to record data on said recording medium, said data including a first data group and a second data group, said first data group being recorded under a subdirectory, which is under an upper directory higher than the subdirectory, onto said recording medium in accordance with a BDAV recording format, said second data group being recorded under another subdirectory, which is under the upper directory higher than the other subdirectory, onto said recording medium in accordance with a BDMV recording format different from said BDAV recording format, said first recording data group including first list indication data which is used for a first indicating method applicable to data under the BDAV recording format, said second recording data group including second list indication data which is used for a second list indicating method applicable to data under the BDMV recording format different from said first list indicating method, said first list indication data corresponding to said first data group, and said second list indication data corresponding to said second data group;

the control unit controls the recording medium so as to record information on a flag for performing the first data group and the second data group to be list-indicated;

the flag includes a coexistence flag, which indicates coexistence of the subdirectory and the other subdirectory;

the coexistence flag is stored as a file under the subdirectory or the other subdirectory;

said first data group and said second data group are collectively list-indicated if the coexistence flag is detected; and the control unit controls the data reproducing unit so as to reproduce the information on the flag and also to list-indicate said first data group and said second data group according to the information reproduced.

4. A data recording method of recording data onto a recording medium, comprising the steps of:

recording said data including at least a first data group and a second data group, said first data group being recorded under a subdirectory, which is under an upper directory higher than the subdirectory, onto the recording medium in accordance with a BDAV recording format, said second data group being recorded under another subdirectory, which is under the upper directory higher than the other subdirectory, onto the recording medium in accordance with a BDMV recording format different from said first recording format, said first recording data group including first list indication data for a first list indicating method applicable to data under the BDAV recording format, said second recording data group including second list indication data for a second list indicating method applicable to data under the BDMV recording format different from said first list indicating method, said first list indication data indicating said first data group and said second list indication data indicating said second data group;

recording a coexistence flag for permitting the first data group and the second data group to be list-indicated when the second data group is to be recorded onto the recording medium on which the first data group has been already recorded, wherein:

the coexistence flag indicates coexistence of the subdirectory and the other subdirectory, the coexistence flag is stored as a file under the subdirectory or the other subdirectory, and said first data group and said second data group are collectively list-indicated if the coexistence flag is detected; and recording the second data group.

* * * * *